US011643269B2

(12) United States Patent
Cafaro et al.

(10) Patent No.: US 11,643,269 B2
(45) Date of Patent: May 9, 2023

(54) CONTAINER AND OPENING ARRANGEMENT FOR BEVERAGE PRODUCTION

(71) Applicant: Bedford Systems, LLC, Bedford, MA (US)

(72) Inventors: Enrico Raffaele Cafaro, Beverly, MA (US); Michael Sack, North Reading, MA (US); Ian Scott Rice, Framingham, MA (US)

(73) Assignee: Bedford Systems, LLC, Bedford, MA (US)

( * ) Notice: Subject to any disclaimer, the term of this patent is extended or adjusted under 35 U.S.C. 154(b) by 178 days.

(21) Appl. No.: 16/184,767

(22) Filed: Nov. 8, 2018

(65) Prior Publication Data

US 2019/0077586 A1    Mar. 14, 2019

Related U.S. Application Data

(63) Continuation-in-part of application No. 15/829,754, filed on Dec. 1, 2017.

(Continued)

(51) Int. Cl.
*B65D 85/804* (2006.01)
*A47J 31/40* (2006.01)
(Continued)

(52) U.S. Cl.
CPC .......... *B65D 85/8049* (2020.05); *A47J 31/32* (2013.01); *A47J 31/407* (2013.01); *B65D 41/50* (2013.01);
(Continued)

(58) Field of Classification Search
CPC .... B65D 41/50; B65D 43/0204; B65D 43/02; B65D 85/8043; B65D 51/20; B65D 51/22; A47J 31/407
See application file for complete search history.

(56) References Cited

U.S. PATENT DOCUMENTS

| 4,029,003 | A |   | 6/1977 | Manaresi |
|-----------|---|---|--------|----------|
| 5,039,012 | A | * | 8/1991 | Inaba ............... A47G 21/18 |
|   |   |   |   | 239/33 |

(Continued)

FOREIGN PATENT DOCUMENTS

| AU | 2002213874 B2 | 7/2004 |
|----|---------------|--------|
| CN | 101485542 A | 7/2009 |

(Continued)

OTHER PUBLICATIONS

International Search Report and Written Opinion of the International Searching Authority for International Patent Application No. PCT/US2017/064343, dated Feb. 19, 2018 (11 pages).

(Continued)

*Primary Examiner* — Moshe Wilensky
*Assistant Examiner* — Kyle A Cook
(74) *Attorney, Agent, or Firm* — Dorsey & Whitney LLP

(57) ABSTRACT

Systems, methods and containers for forming a beverage. A beverage container includes an enclosure arranged with a movable element that is movable to pierce a membrane and permit beverage material in the container to exit. The movable element can also be moveable to permit pressurized gas entry into the container and through the membrane. Gas can be introduced into the container to force beverage material to exit the container. A gas inlet port can be provided with the enclosure and arranged to mate with a gas source of a beverage machine.

17 Claims, 15 Drawing Sheets

Related U.S. Application Data

(60) Provisional application No. 62/646,800, filed on Mar. 22, 2018, provisional application No. 62/646,813, filed on Mar. 22, 2018, provisional application No. 62/428,900, filed on Dec. 1, 2016.

(51) Int. Cl.
*B65D 41/50* (2006.01)
*A47J 31/32* (2006.01)

(52) U.S. Cl.
CPC ..... *B65D 85/8052* (2020.05); *B65D 85/8055* (2020.05)

(56) References Cited

U.S. PATENT DOCUMENTS

| | | | |
|---|---|---|---|
| 5,817,082 A * | 10/1998 | Niedospial, Jr. | A61J 1/2096 604/414 |
| 5,895,383 A | 4/1999 | Niedospial | |
| 5,902,298 A | 5/1999 | Niedospial et al. | |
| 6,142,063 A | 11/2000 | Beaulieu et al. | |
| 6,240,832 B1 | 6/2001 | Schmed et al. | |
| 6,606,938 B2 | 8/2003 | Taylor | |
| 6,644,173 B2 | 11/2003 | Lazaris et al. | |
| 7,165,488 B2 | 1/2007 | Bragg et al. | |
| 7,316,178 B2 | 1/2008 | Halliday et al. | |
| 7,827,905 B2 | 11/2010 | Bardazzi | |
| 9,801,494 B2 | 10/2017 | Castellani | |
| 2003/0066431 A1 | 4/2003 | Fanzutti et al. | |
| 2003/0071056 A1 | 4/2003 | Hale | |
| 2004/0231521 A1 | 11/2004 | Yoakim | |
| 2004/0250686 A1 | 12/2004 | Hale | |
| 2005/0160919 A1 | 7/2005 | Balkau | |
| 2006/0123998 A1 | 6/2006 | Castellani | |
| 2007/0221066 A1 | 9/2007 | Sullivan et al. | |
| 2008/0029540 A1 | 2/2008 | Johnson | |
| 2008/0041234 A1 | 2/2008 | Cortese | |
| 2009/0007794 A1 | 1/2009 | Cortese | |
| 2009/0155422 A1 | 6/2009 | Ozanne | |
| 2009/0308882 A1 * | 12/2009 | Hundley | B65D 47/2031 220/712 |
| 2010/0083843 A1 | 4/2010 | Denisart et al. | |
| 2010/0107889 A1 | 5/2010 | Denisart et al. | |
| 2010/0192779 A1 | 8/2010 | Tanner et al. | |
| 2010/0288132 A1 | 11/2010 | Gavillet et al. | |
| 2011/0000377 A1 | 1/2011 | Favre | |
| 2011/0017072 A1 | 1/2011 | Frigeri et al. | |
| 2013/0142931 A1 | 6/2013 | Fin et al. | |
| 2013/0152797 A1 | 6/2013 | Mori | |
| 2013/0239820 A1 | 9/2013 | Baldo | |
| 2013/0276638 A1 | 10/2013 | Kristlbauer | |
| 2014/0048549 A1 * | 2/2014 | Wille | B65D 47/0895 220/713 |
| 2014/0076170 A1 | 3/2014 | Epars et al. | |
| 2014/0137748 A1 | 5/2014 | Perentes | |
| 2014/0178546 A1 | 6/2014 | Besson et al. | |
| 2014/0212556 A1 | 7/2014 | Larzul et al. | |
| 2014/0298999 A1 | 10/2014 | Lloret et al. | |
| 2014/0326144 A1 | 11/2014 | Novak et al. | |
| 2015/0017288 A1 | 1/2015 | Lo Faro et al. | |
| 2015/0050404 A1 | 2/2015 | Ferrier | |
| 2015/0059587 A1 | 3/2015 | Colleoni | |
| 2015/0059588 A1 | 3/2015 | Castellani | |
| 2015/0135965 A1 | 5/2015 | Lo et al. | |
| 2015/0203285 A1 | 7/2015 | Baldo | |
| 2015/0272376 A1 | 10/2015 | Flick et al. | |
| 2015/0368033 A1 | 12/2015 | Krug et al. | |
| 2016/0051080 A1 | 2/2016 | Lo et al. | |
| 2016/0152409 A1 | 2/2016 | Cafaro et al. | |
| 2016/0068334 A1 | 3/2016 | Cafaro et al. | |
| 2016/0106136 A1 | 4/2016 | Gordon et al. | |
| 2016/0106256 A1 | 4/2016 | Gordon et al. | |
| 2016/0107831 A1 | 4/2016 | Talon et al. | |
| 2016/0137402 A1 | 5/2016 | Talon et al. | |
| 2016/0174752 A1 | 6/2016 | Casiddu | |
| 2016/0235242 A1 | 8/2016 | Mchugh et al. | |
| 2016/0297664 A1 * | 10/2016 | Broodryk | B67D 1/0021 |
| 2016/0324361 A1 | 11/2016 | Van Belleghem et al. | |
| 2017/0127872 A1 | 5/2017 | Dumur et al. | |
| 2019/0016580 A1 * | 1/2019 | Kruger | A47J 31/4425 |
| 2019/0256279 A1 * | 8/2019 | Muhlemann | B65D 85/8043 |
| 2019/0292034 A1 | 9/2019 | Wood et al. | |
| 2021/0000283 A1 | 1/2021 | Burrows | |

FOREIGN PATENT DOCUMENTS

| | | |
|---|---|---|
| CN | 101754899 A | 6/2010 |
| CN | 103826508 A | 5/2014 |
| CN | 203609279 U | 5/2014 |
| CN | 104093341 A | 10/2014 |
| CN | 104736021 A | 6/2015 |
| CN | 106659316 A | 5/2017 |
| EP | 1310199 A1 | 5/2003 |
| EP | 1486150 A2 | 12/2004 |
| EP | 2241228 A1 | 10/2010 |
| EP | 2520203 B1 | 1/2014 |
| WO | 2010076698 A1 | 7/2010 |
| WO | 2011094677 A2 | 8/2011 |
| WO | 2011138723 A1 | 11/2011 |
| WO | 2012146470 A1 | 11/2012 |
| WO | 2014037598 A1 | 3/2014 |
| WO | 2016040268 A2 | 3/2016 |
| WO | 2017121798 A1 | 7/2017 |

OTHER PUBLICATIONS

International Search Report and Written Opinion for International Application No. PCT/US2019/023560 dated Jul. 4, 2019.
International Search Report and Written Opinion for Int'l Application No. PCT/US2019/023707 dated Jun. 26, 2019.
Extended European Search Report and Opinion for EP Application No. 19771421.5 dated Nov. 26, 2021.

* cited by examiner

CONTAINER AND OPENING ARRANGEMENT FOR BEVERAGE PRODUCTION

RELATED APPLICATIONS

This application is a continuation-in-part of U.S. application Ser. No. 15/829,754, filed on Dec. 1, 2017, titled "Container and Opening Arrangement for Beverage Production" which claims priority to U.S. Provisional Application No. 62/428,900, filed on Dec. 1, 2016, titled "Container and Opening Arrangement for Beverage Production". This application also claims priority to U.S. Provisional Application No. 62/646,813, filed on Mar. 22, 2018, titled "Puncture Mechanism for Beverage Machine" and U.S. Provisional Application No. 62/646,800, filed on Mar. 22, 2018, titled "Pod Assembly for Beverage Machine". The contents of which are hereby incorporated by reference in their entireties.

FIELD

The technology disclosed herein relates generally to beverage dispensing systems, and more particularly, to a pod assembly for a beverage machine.

BACKGROUND

Self-serve appliances allow a user to enjoy a fresh cup of coffee merely by inserting a cartridge or capsule containing powder instant flavor into the self-serve appliance. The appliance then opens the cartridge or capsule internal to the machine and combines the flavored powder with water to generate the desired beverage.

A number of different piercing elements are used to pierce the cartridges or capsules, thereby allowing for the generation of the desired beverage. U.S. Pat. No. 7,316,178 to Halliday et al., for example, teaches a beverage preparation machine for preparing a beverage from a cartridge containing one or more beverage ingredients including a first piercing element for forming an inlet in a cartridge received in the beverage preparation machine, and a second piercing element for forming an outlet in the cartridge. According to Halliday, the first and second piercing elements are formed as a single removable unit that forms a part of the beverage preparation machine. However, with Halliday and other traditional self-serve appliances, including the piercing element as part of the appliance creates a location susceptible to cross-contamination or reduced sterility.

SUMMARY

Embodiments of the present invention are directed to a beverage container. The beverage container can include a sealed internal space that holds a beverage material. A flexible diaphragm of the beverage container can be manipulated by a beverage appliance or other machine in order to puncture the sealed internal space. For example, in one embodiment, the cartridge includes a moveable piercing feature that can be used to define both an inlet (for pressurized gas) and an outlet (for beverage material) for the sealed internal space.

For example, in an embodiment, a beverage container is disclosed. The beverage container includes a body having an internal space and an opening extending to the internal space. The beverage container further includes a membrane sealing the internal space along the opening. The beverage container further includes an enclosure connected to the body adjacent to the membrane and including a moveable piercing feature configured to advance at least partially through the membrane and define an inlet path and an outlet path for the internal space.

In another embodiment, the enclosure can be configured to extend over the membrane and form a seal with the body about a perimeter of the opening. The enclosure can also include a flexible diaphragm configured to permit advancement of the moveable piercing feature at least partially through the membrane. The moveable piercing feature can further include an elongated projection having a sharp end portion adapted for piercing the membrane. In some cases, the elongated projection defines: (i) a first passage arranged along an exterior of the elongated projection and forming the inlet path; and (ii) a second passage arranged through the elongated projection, separated from the first passage, and forming the outlet path.

In another embodiment, the beverage container further includes a beverage medium sealed within the internal space by the membrane. The enclosure can be configured to receive a supply of carbonated gas. The moveable piercing feature can be configured to direct the supply of carbonated gas to the internal space, via the inlet path. Additionally or alternatively, the moveable piercing feature can be configured to produce a single opening in the membrane. In this regard, the inlet path and the outlet path are distinct flow paths that both extend through the single opening.

In another embodiment, the body includes a rim defining the opening. In this regard, the membrane can be a sheet of material sealed to the body along a complete rotation of the rim. In some cases, the membrane can be configured to maintain the seal with the body in response to an advancement of the moveable piercing feature at least partially through the sheet.

In another embodiment, a beverage container is disclosed. The beverage container includes an enclosure encompassing a sealed region. The enclosure is configured to prevent escape of a beverage material. The enclosure includes a piercing feature defining two passages. The enclosure further includes a flexible diaphragm connected with the piercing feature and configured to permit movement of the piercing feature between a first position and a second position. In the first position, the piercing feature is offset from the sealed region. In the second position, the piercing feature is advanced at least partially through the sealed region, thereby inducing flow through the sealed region through each of the two passages.

In another embodiment, the beverage container includes a body configured to hold the beverage material. The body defines the sealed region. The enclosure is connected to the body. In some cases, the enclosure further includes an attachment portion fixed to the body. The flexible diaphragm can include a first side connected to the attachment portion and a second side connected to the piercing feature. The attachment portion can define a gas inlet fluidically coupled with a first passage of the two passages and configured to receive pressurized gas. Further, a second passage of the two passages can be separated from the first passage and forms an outlet for pressurized beverage material through the sealed region.

In another embodiment, wherein the piercing feature defines: (i) an elongated blind recess that forms a first passage of the two passages; and (ii) an elongated lumen that forms a second passage of the two passages. In some cases, the piercing feature includes a substantially sharp projection housing the two passages.

In another embodiment, the flexible diaphragm is a ring-shaped feature surrounding the piercing feature. In some cases, the beverage container can include the beverage material.

In another embodiment, a beverage container is disclosed. The beverage container includes a body holding a beverage material and defining a sealed region configured for accessing the beverage material. The beverage container further includes an enclosure connected to the body and covering the sealed region. The enclosure defines a gas inlet at an external surface and includes a moveable portion. The moveable portion is configured for piercing the sealed region and defining a first passage fluidically coupled with the gas inlet and configured for pressurized gas introduction into the body. The moveable portion further defines a second passage fluidically separated from the gas inlet and configured for beverage material exit.

In some embodiments, the beverage container further includes a membrane encompassing the sealed region. In this regard, the moveable portion can include a protrusion configured for forming a single opening in the membrane.

In another embodiment, the protrusion defines each of the first passage and the second passage. The second passage can be a lumen extending through a thickness of the moveable portion and fluidically coupled with a beverage material outlet of the beverage container that is distinct from the gas inlet.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1:
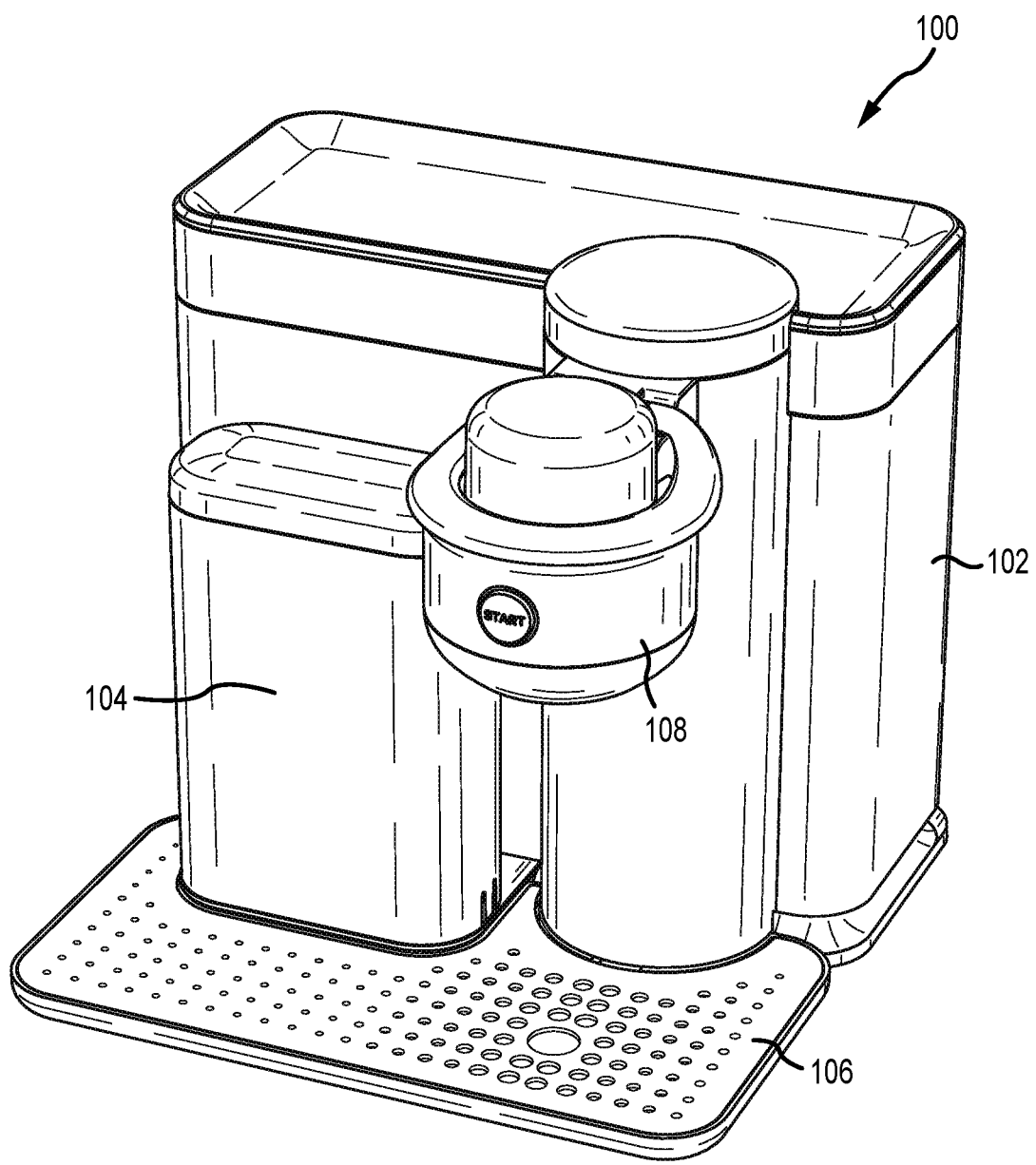
FIG. 1 depicts a sample beverage appliance.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The description that follows includes sample systems, methods, and apparatuses that embody various elements of the present disclosure. However, it should be understood that the described disclosure can be practiced in a variety of forms, in addition to those described herein.

The present disclosure describes systems, devices, and techniques related to beverage containers and associated beverage appliances, machines, and so on. The beverage container includes one or more beverage materials that is sealed in an internal space of the container. As described herein, the beverage material can include, but is not limited to, certain powdered drink mixes, syrups, liquid mixes, concentrates, and so on that are used by a beverage appliance to produce a beverage, such as a single serving coffee, tea, soda, seltzer, alcohol, and so on. Additionally or alternatively, the beverage container can also include certain gas producing elements, including charge zeolites for use in carbonating the beverage material or other flavoring used in producing the target beverage; however, this is not required.

Broadly, the beverage material is sealed within an internal space of the beverage container by a membrane or other pierceable layer. The beverage container includes one or more structures or assemblies that operate to pierce the membrane, thereby allowing an associated beverage appliance to access the beverage material for production of a beverage, such as the various single serving beverages described herein. By incorporating structures and assemblies that pierce the membrane within the beverage container itself, cross-contamination can be reduced. For example, such structures and assemblies are specifically associated with the beverage material of the given beverage container and single-use, and as such, don't necessarily interact or encounter beverage materials from other containers.

To facilitate the foregoing, the beverage containers described herein can generally include a body and an enclosure. The body can be a vessel or other storage structure that defines the internal space configured to receive and hold the beverage material. The enclosure (or "closure" more broadly) can be a cap, fitting, shield, and so on that covers a sealed region of the body that prevents the beverage material from exiting the internal space. The sealed region of the body can be an opening (used to introduce the beverage material into the internal space during manufacture) that is sealed by the membrane or other like structure. The enclosure fits over the membrane and forms an interface of the beverage container for the beverage machine or appliance.

The enclosure includes a structure, assembly, component, or the like that operates to pierce the membrane and allow the beverage machine to access the beverage material sealed within. To facilitate the foregoing, the enclosure includes a moveable element having at least one piercing feature and/or other puncture mechanism. The moveable element is configured for engagement by the beverage machine and operated to advance the piercing feature toward the membrane. For example, as described herein, the beverage machine can include an anvil or other structure that causes the moveable element to move toward the membrane. As such, the piercing feature can be advanced toward the membrane and form one or more holes through the membrane, thereby releasing the beverage material. The enclosure or other component of the beverage container can include various paths that direct the released beverage material into an internal process of the beverage machine that uses the beverage material in the production of a single serving beverage, or releases the beverage material externally to a cup.

In an embodiment, it can be desirable to introduce pressurized gas, carbonated liquid, and so on into the internal space holding the beverage material. For example, this can facilitate rapid exit of the beverage material from the internal space. In other cases, the pressurized gas can be introduced to facilitate mixing. Accordingly, the moveable element can operate to form one or more openings that are configured to introduce pressurized gas into the internal space. In this regard, the moveable element can include one or more piercing structures or assemblies that are advanced toward, and puncture, the membrane, thereby allowing the moveable element to define each of an inlet path and an outlet path for the internal space. For example, the inlet path can be a path that directs pressurized gas or the like into the internal space and the outlet path can be a path that directs beverage material (including pressurized beverage material) from the internal space.

In some cases, the moveable element can include multiple piercing elements that operate to create discrete holes or openings in and through the membrane. In other cases, a single piercing structure can be advanced through the membrane and define each of a distinct inlet path and an outlet path. As a sample illustration, the moveable element can include a piercing element that is an elongated structure that have a sharp end and two passages. The sharp end can be a point or distal end of the piercing structure that interfaces with the membrane in order to create a single hole or point of entry into the membrane. One of the passages defined by the piercing element can be a blind recess extending along a side of the piercing element. A second of the passages defined by the piercing element can be an elongated lumen that extends through a body of the piercing element. Accordingly, the piercing element can be advanced toward the membrane and form a single hole, and the passages can define respective inlet and outlet paths through the single hole.

As described herein, the enclosure can be configured for engagement with a beverage appliance. The beverage appliance can be arranged to perform multiple operations associated with the beverage container, including delivering a supply of pressurized gas to the beverage container, moving or manipulating the moveable element of the container, and/or receiving the beverage material from the beverage container, among other possible operations. In this regard, the beverage container can have a gas inlet that is configured for engagement with a feature of the beverage appliance and directs pressurized gas toward the membrane and internal space of the container. In one embodiment, the gas inlet can be fluidically connected with a passage defined along an exterior surface of the piercing element (e.g., such as the blind recess). In this regard, upon formation of the hole in the membrane by the piercing element, pressurized gas can flow through the passage and into the internal space. In some cases, this can pressurize the internal space, thereby facilitating rapid exit of the beverage material through the single opening formed by the piercing element.

The beverage material (including pressurized beverage material) can exit the internal space via the other passage defined by the piercing element (e.g., such as the elongated lumen). The elongated lumen can extend through a body of the piercing element and direct the beverage material to a beverage material outlet of the beverage container. In this manner, the same piercing element can form a single opening in the membrane for both pressurized gas introduction and release of the beverage material. This can help reduce system complexity and enhance the adaptability of the beverage container to various beverage materials, carbonation sources, and so on. For example, by requiring only a single point of entry into the internal space, materials and dimensions of the beverage container can be streamlined to accommodate various different beverage material types (and volumes) without the structure considerations that can be required for forming multiple points of entry.

It will be appreciated, however, that the embodiments disclosed herein are not limited to forming a single point of entry or defining discrete inlet and outlet paths with a single structure. To the contrary, the present disclosure includes structures and techniques for defining discrete inlet and outlet paths through the membrane using a moveable element that can be controllably manipulated by a beverage appliance. Because the inlet and outlet paths are formed by components and structures of the beverage container itself, the beverage appliance can be less susceptible to cross-contamination, for example, from multiple distinct beverages produced sequentially.

Reference will now be made to the accompanying drawings, which assist in illustrating various features of the present disclosure. The following description is presented for purposes of illustration and description. Furthermore, the description is not intended to limit the inventive aspects to the forms disclosed herein. Consequently, variations and modifications commensurate with the following teachings, and skill and knowledge of the relevant art, are within the scope of the present inventive aspects.

FIG. 1 depicts a sample beverage appliance or machine 100 in accordance with various aspects of the present disclosure. The beverage machine 100 can include a housing 102 that shields various components of the machine, a reservoir 104 that holds a liquid (e.g., water) used to form a beverage, and a drip tray 106 that supports a user's cup or other container for receiving a dispensed beverage. The reservoir 104 can be removable from the housing 102 such that a user can fill the reservoir 104 with a beverage precursor liquid, such as water, that is used to form a beverage dispensed at a dispensing station 108 into a user's container. The reservoir 104 can include a movable lid to facilitate a user in filling the reservoir 104 with the precursor liquid. In various examples, the reservoir 104 can be replaced by a plumbed connection to a direct or main water source. The beverage precursor liquid can be any suitable liquid, including water or any other suitable liquid used to form a beverage. The reservoir 104 or main water source can form part of a beverage precursor supply which provides the beverage precursor liquid for conditioning of some kind (e.g., filtering, chilling, carbonating, mixing with a beverage medium, and subsequent dispensing as a beverage).

Various components of the beverage machine 100 can be located within the housing 102. For example, a pump can be located within the housing 102 and can move precursor liquid from the reservoir 104 to a carbonation system, where the precursor liquid can be carbonated via a gas. Depending on the particular application, the gas can be supplied by a pressurized canister or bottle, such as a carbon dioxide canister or bottle, located within the housing 102. In some examples, the precursor liquid can be chilled by a cooling system, either before, during, or after carbonation. Cooling the precursor liquid during carbonation can help the carbonation process. For instance, a cooler liquid tends to dissolve carbon dioxide or other gas more rapidly and/or is capable of dissolving a larger amount of gas. In some examples, the precursor liquid is cooled to about four degrees Celsius or lower to facilitate carbonation of the precursor liquid. The carbonated liquid can be moved to the dispensing station 108 and dispensed into the container 106. To generate a desired beverage, the carbonated liquid can be mixed with a beverage material (e.g., a flavoring agent or other associated substance) contained in a beverage container (e.g., such as the various beverage containers described herein with respect to FIGS. 2A-20). The beverage material can be emptied from the beverage container in a variety of ways. For instance, the beverage material can drain from the beverage container by gravity flow. Additionally or alternatively, as described in greater detail below, the beverage material can be moved out of the beverage container by introducing gas or fluid into the beverage container under pressure.

Control of the beverage machine 100 and its components can be performed by control circuitry, which can include a programmed general purpose computer and/or other data processing devices along with suitable software or other operating instructions, one or more memories (including non-transient storage media that can store software and/or other operating instructions), a power supply for the control circuitry and/or other system components, temperature and liquid level sensors, pressure sensors, RFID interrogation devices or other machine readable indicia readers (such as those used to read and recognize alphanumeric text, barcodes, security inks, etc.), input/output interfaces (e.g., such as a user interface to display information to a user and/or receive input from a user), communication buses or other links, a display, switches, relays, triacs, motors, mechanical linkages and/or actuators, and/or other components necessary to perform desired input/output or other functions of the beverage machine 100.

Figure 2A:
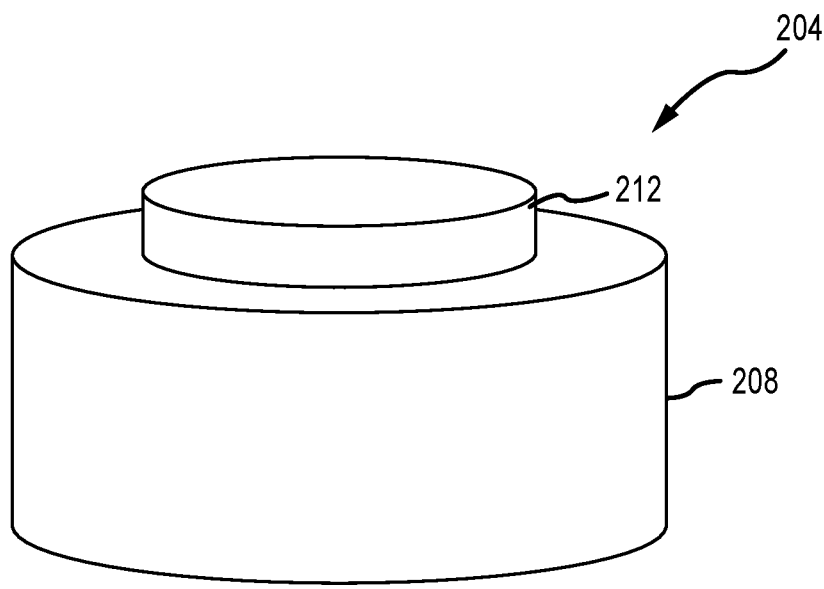
FIG. 2A depicts a schematic view of a sample beverage container.
Figure 2B:
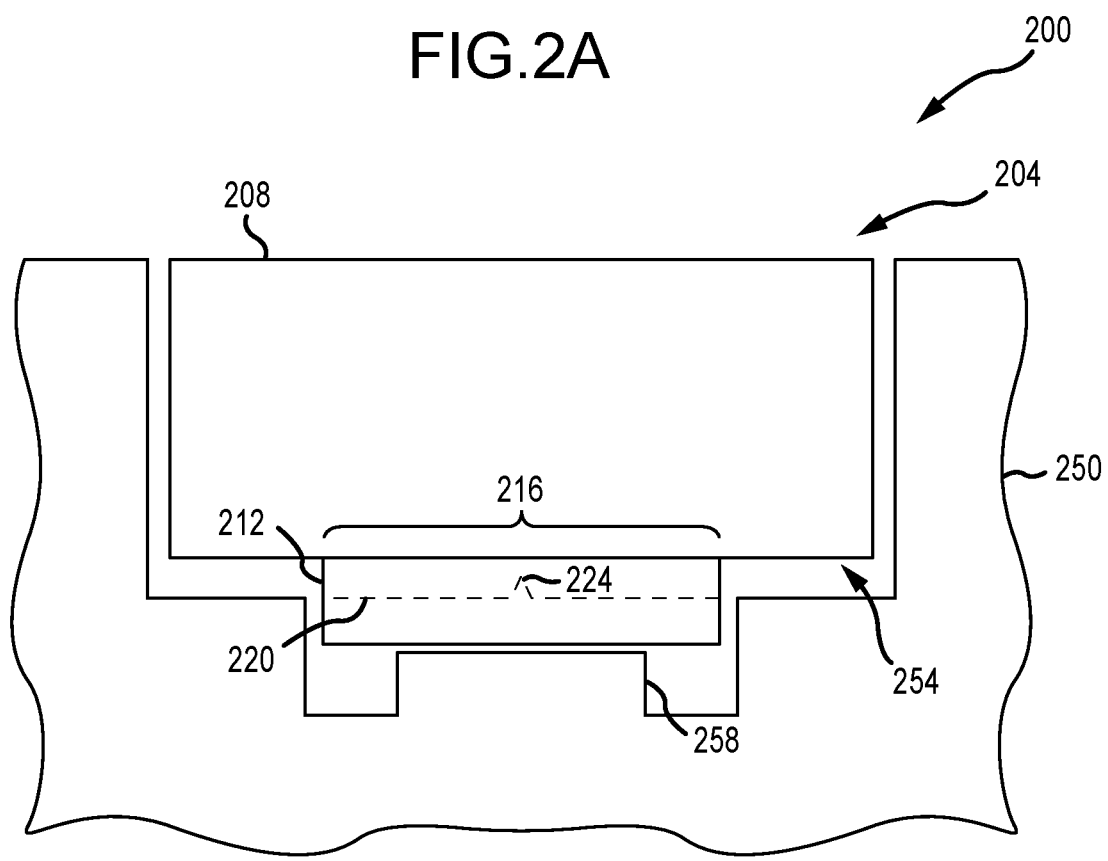
FIG. 2B depicts a schematic view of the sample beverage container of FIG. 2A received by a beverage appliance.
Figure 2C:
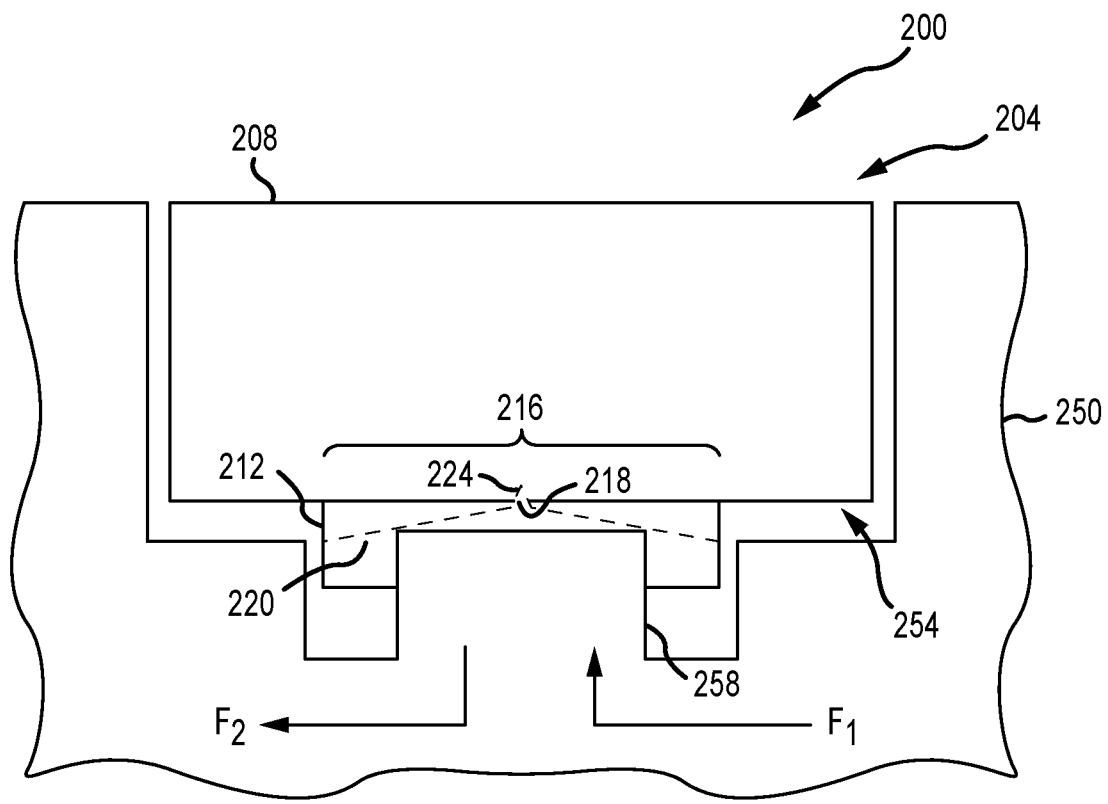
FIG. 2C depicts a schematic view of the beverage appliance of FIG. 2B inducing flow with the beverage container.

FIGS. 2A-2C depict a schematic representation of a sample beverage container and associated beverage system, according to the embodiments described herein. The beverage container can include a sealed beverage material within an internal space. The beverage container can further include a mechanism that is configured for manipulation by a beverage appliance and that operates to access the sealed beverage material. For example, the beverage container can include a moveable piercing feature that is engaged by the beverage appliance and moved toward a membrane that seals the beverage material in order to access the beverage material.

By way of particular example, with reference to FIG. 2A, a beverage container 204 is shown. The beverage container 204 can be used to hold a volume of beverage material such as the various powdered drink mixes, syrups, liquid mixes, concentrates, and so on, described herein. The beverage container 204 can seal the beverage material from an external environment, and as such, operate to preserve the beverage material for subsequent access by a beverage appliance or machine.

In the embodiment of FIG. 2A, the beverage container 204 includes a body 208. The body 208 can be a vessel, tank, pod, cartridge portion, or other like structure having an internal space that is configured to hold the beverage material. The internal space can be tailored to hold a particular volume of beverage material as can be suited for a particular application. For example, the body can define the internal space as having a volume of 50 milliliter to 350 milliliters, such as having a volume of approximately 100 milliliters. In some cases, however, the body can define an internal space of less than 50 milliliters or greater than 350 milliliters in order to suit a desired volume of beverage material that can be required for the operation of an associated beverage appliance or machine. For example, a given beverage appliance or machine can use or require a predetermined volume of beverage material (e.g., concentrate) in order to produce a desired volume of a single serving beverage (e.g., which can be a beverage having a volume of 500 milliliters or more) and, as such, the beverage container can be adapted to hold a corresponding volume of beverage material. In this regard, it will be appreciated that FIG. 2A, shows the beverage container having a particular size and dimension solely for purposes of illustration. The beverage container 204 can be constructed in a variety of sizes, as contemplated within the scope of the present disclosure.

The beverage container 204 is operable to provide access to the sealed beverage material within the body 208. In the embodiment of FIG. 2A, the beverage container 204 includes an enclosure 212. The enclosure 212 can be any appropriate close, cap, fitting, shield, or the like that covers a sealed region of the body 208 that defines an entry to the sealed beverage material. For example, as described herein, the body 208 can define a sealed region at an opening or neck of the body 208. The beverage material can be initially prevented from exiting from the body 208 at the sealed region, for example, by operation of a membrane or other structure.

The enclosure 212 fits substantially over a portion of the body 208 and covers the sealed region from an external environment. Not only does this protect the sealed region and help mitigate inadvertent access to the sealed beverage material, the enclosure 212 also defines various structures and assemblies that can be used by an associated beverage appliance to access the beverage material. For example, as described herein, the enclosure includes at least a moveable element having a protrusion or other opening features that are able to be advanced toward the sealed region and configured to provide access to the beverage material. For example, the protrusion can form one or more openings in a membrane or other structure that seals the beverage material within the internal space at the sealed region. In some cases, the protrusion, and moveable element more generally, can operate to define distinct inlet and outlet paths into the internal space. As described herein, this can allow for entry of pressurized gas into the internal space, and subsequent exit of the beverage material (including pressurized beverage material) from the internal space, and optionally into an associated beverage appliance or machine.

The beverage container 204 can be configured for use with a beverage appliance or machine, such as a machine that manipulates the container 204 for access of the sealed beverage material. With reference to FIG. 2B, the beverage container 204 is shown within a beverage system 200. The beverage system 200 includes the beverage container 204 and a beverage appliance 250.

Broadly, the beverage appliance 250 can be substantially any machine, apparatus, device, and so on that operates to receive the beverage container 204 and manipulate the beverage container 204 for access of the sealed beverage material. In this regard, the beverage appliance 250 can be a machine configured to produce a single-serving quantity of coffee, tea, soda, seltzer, alcohol, and so on substantially from or at least partially based on the beverage material held within the beverage container 204. As such, the beverage appliance 250 can be substantially analogous to the beverage appliance 100 described above with respect to FIG. 1, redundant explanation of which is omitted here for clarity. It will be appreciated therefore that the schematic representation of the beverage appliance depicted in FIGS. 2B and 2C shows a sample operation of the beverage appliance 250 and the beverage appliance 204. The beverage appliance 250 can include various piping, controls, instrumentation, mechanical systems, and so forth to facilitate the operations described herein, for example, such as those described with respect to FIGS. 1, 11-14, and 20.

The beverage appliance 250 can be configured to engage a portion of the beverage container 204 in a manner that causes the beverage container 204 to release some or all of the beverage material. In some cases, the beverage appliance 250 can also engage the beverage container 204 in a manner that allows pressurized gas (which can be stored within a vessel of the beverage appliance 250) to flow into the internal space of other compartment of beverage container 204, which can facilitate rapid exit of the beverage material from the beverage container 204. To facilitate the foregoing, the beverage appliance can include or define a portion of a cartridge holder 254. The cartridge holder 254 can be configured to receive the beverage container 204. For example, the cartridge holder 254 can have dimensions, such as a width, height, and so on, that conform or correspond to dimensions of the beverage cartridge 204. In some cases, as described herein, the cartridge holder 254 can include adaptable portions that move in order to engage one or more surfaces of the beverage container 204, thereby allowing the cartridge holder to receive and optionally secure beverage containers of various shapes, sizes, and so on.

The beverage appliance 250 can also include anvil 258. The anvil 258, as shown in FIG. 2B, can be positioned within, or associated with, the cartridge holder 254. The anvil 258 can be a moveable portion of the beverage appliance 250 can engage a portion of the beverage container 204. For example, as shown in FIG. 2B, the anvil 258 is positioned adjacent to the beverage container 204 that is received within the cartridge holder 254. In particular, the anvil 258 is positioned adjacent to the enclosure 212 of the beverage container 204. As such, the anvil 258 can move relative to the beverage container 204 and engage the enclosure 212, in order to facilitate release of the sealed beverage material from the beverage container 204.

As described above, the enclosure 212 includes a moveable element having a protrusion or other features that forms a hole in a sealed region of the body 208, when advanced. The anvil 258 can generally engage this moveable element of the enclosure 212 in order to access the sealed beverage material. For example, as shown in the schematic representation of FIG. 2B, the beverage container 204 can include a sealed region 216. The sealed region 216 can define an interface between an internal space of the body 208 having the beverage material and the enclosure 212. In some cases, a membrane or other film-type material can seal the beverage material within the internal space at the sealed region 216.

As shown in the schematic example of FIG. 2B, the enclosure 212 is fitted over the sealed region 216 and includes a moveable element 220 (shown in phantom). The moveable element 220 can include a protrusion 224. Broadly, the moveable element 220 can be engaged by the anvil 258 in order to advance the protrusion 224 at least partially through the sealed region 216, thereby breaching a seal defined by the sealed region and allowing for exit of the beverage material. In some cases, the protrusion 224 and/or the moveable element 220 more generally can operate to form one or more openings through the sealed region and define at least a distinct inlet path (for pressurized gas introduction) and outlet path for beverage material exit.

With reference to FIG. 2C, the beverage system 200 is shown in a configuration in which the anvil 258 is show schematically in an advanced or actuated position to facilitate release of the beverage material from the beverage container 204. For example, in the advanced or actuated position shown in FIG. 2C, the anvil 258 extends at least partially into the enclosure 212. This can cause the moveable element 220 to move toward the sealed region 216. In some cases, the anvil 258 can engage an exterior surface of the beverage container 204 defined by the moveable element 220, and as such, the movement of the anvil toward the beverage container 204 can correspondingly cause the moveable element to move toward the sealed region 216.

As further shown in FIG. 2C, movement of the moveable element 220 can cause the protrusion 224 to traverse a portion of the sealed region 216. For example, the protrusion 224 can puncture or pierce a membrane or other layer that operates to seal the beverage material within the internal space at the sealed region 216. In the schematic illustration of FIG. 2C, the protrusion 224 traverses the sealed region 216 and forms at least one through portion 218 across the sealed region 216. The through portion can represent multiple openings in a membrane or other structure at the sealed region, or it can be a single discrete opening.

Multiple flow paths can be defined across the sealed region 216 at the through portion 218. For example, the through portion 218 can define at least an inlet path F1 and an outlet path F2. As described herein, the outlet path F1 can be a path for the introduction of pressurized gas into the interior space of the body 208. The inlet path F2 can be a path for the exit of beverage material from the internal space. In some cases, each of the inlet path F1 and outlet path F2 can be defined at least partially by the protrusion 224. For example, the protrusion 224 can include a first passage (e.g., such as a blind recess) that at least partially defines the inlet path F1 into the internal space and a second passage (e.g., an elongated lumen through a body of the protrusion) that at least partially defines the outlet path F2, as described in greater detail below.

The beverage container 204, and associated beverage appliance 250, can be implemented in a variety of arrangements that facilitate a reduction in cross-contamination, relative to traditional dispensing methods, according to the embodiments described herein. For example, the moveable element 220 described with respect to FIGS. 2A-2C can be or can include a flexible diaphragm or other bi-stable member that moves between a first sealed position and a second position at which the beverage material is released. In other embodiments, the body 208 can include multiple discrete chambers, compartments, and so on to facilitate single-serve beverage production, include separate chamber for holding gas producing substances, mixing, and so forth. In this regard, FIGS. 3-19B present various embodiments, of beverage cartridges, containers, appliances, machines, and so forth involved in beverage production, as described herein. It will be appreciated that the examples of FIGS. 3-19B are presented for purposes of illustration only, and that other containers, beverage cartridges, containers, appliances, machines, and so forth are contemplated within the scope of the present disclosure.

Figure 3:
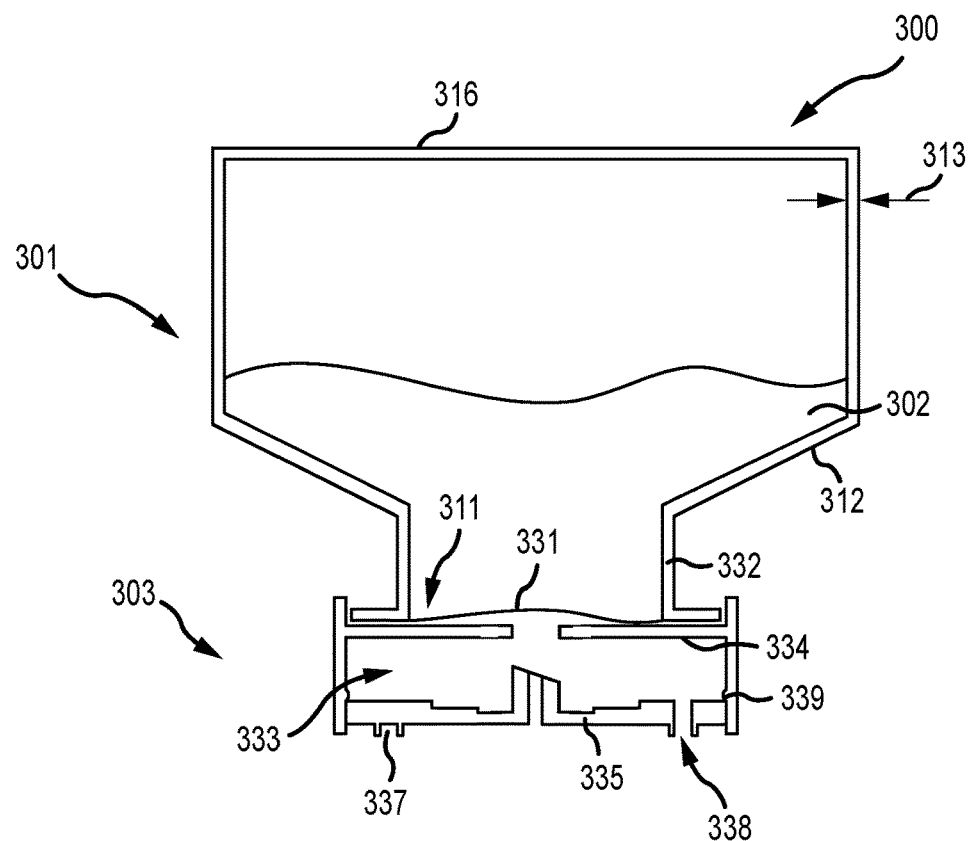
FIG. 3 depicts a cross-sectional view of an embodiment of a beverage container.

FIGS. 3-6 depict an illustrative embodiment of a beverage container 300 that incorporates one or more features of the present exemplary systems and methods. As described in more detail below, the container 300 can be used with a beverage machine to form a beverage. For example, the container 300 can include a vessel 301 that holds a beverage material 302 that can be dispensed from the container 300 by a beverage machine. The beverage material 302 can be mixed with water or other liquid to form a beverage, or the beverage material 302 can be dispensed for consumption without dilution or mixing with any other ingredient. With reference to FIG. 3, a closure 303 includes a pierce-able membrane sealing the opening of the vessel 301 and a movable element positioned outside of the internal space of the vessel 301 that is movable relative to the membrane. The movable element can include a piercing element movable to pierce the membrane, so as to allow access to the internal space, and a channel to conduct a flow of beverage material from the internal space.

For example, as can be seen in FIG. 3 the closure 303 is attached to the vessel 301 so as to seal an opening 311 of the vessel 301 closed. In this embodiment, the opening 311 and closure 303 are located at a bottom 312 of the vessel 301, but the opening 311 and closure 303 could be located at a sidewall 313, a top 316, or other locations on a vessel 301. A pierce-able membrane 331, which can include a sheet of material, such as a metal foil, a polymer, a foil/polymer laminate, or other, can be arranged to seal the opening 311. The membrane 331 can be attached to the vessel 301 at the opening 311, e.g., by welding or adhering the membrane 331 to a rim or lip of the vessel 301 surrounding the opening 311. In such a case, a body 332 of the closure 303 can be attached to the vessel 301 after the membrane 331 is secured in place. Alternately, the membrane 331 can be clamped or squeezed between the body 332 of the closure 303 and the vessel 301, or can be attached to the closure body 332 which itself is sealingly attached to the vessel 301. For example, the closure body 332 can include a wall (such as a cylindrical wall) that defines a pathway 333 through the closure 303 from the top of the closure 303 to a bottom of the closure 303. A ledge 334 can be arranged at an inner surface of the wall (e.g., having an annular shape and extending radially inwardly from the inner surface of the wall), and the membrane 331 can be attached to the ledge 334 to occlude or resist flow through the pathway 333. In this embodiment, the ledge 334, which extends radially inwardly relatively far from the wall of the body 332 to define an opening, but the ledge 334 can extend radially inwardly to a lesser degree, e.g., far enough to provide a surface to support the membrane 331 and no more. In any case, the closure 303 can be said to include the membrane 331, even if the membrane 331 is secured to the vessel 301. The body 332 can engage the vessel 301 in different ways, such as by a snap fit, an interference fit, screw thread, welding, adhesive, etc., and engagement of the closure body 332 with the vessel 301 can provide a leak-tight seal, or it may only form a partial seal, or not (e.g., in the case where the membrane 331 is bonded directly to the vessel 301).

To provide access to the internal space of the vessel 301 and allow the beverage material 302 to exit, the closure 303 can include a movable element 335 positioned in the pathway 333 and movable toward the membrane 331 in the pathway 333. The movable element 335 can carry a piercing element 336 such that the piercing element 336 pierces the membrane 331 to open the pathway 333 to a flow of beverage material 302 from the vessel 301. While the movable element 335 can be arranged in different ways, in this embodiment, the movable element 335 includes a disc that is movable in the pathway 333 toward the top of the closure body 332 and the opening 311. The disc can have any suitable shape, such as a circular, oval, square, rectangular, irregular or other shape when viewed from a top. The piercing element 336 can extend upwardly from the upper side of the movable element (e.g., the disc) and be arranged to pierce the membrane 331 with upward movement of the movable element 335. A channel can be provided at an interior of the piercing element 336 such that beverage material 302 can flow through the piercing element 336, or one or more channels can be provided at an exterior of the piercing element 336 for beverage material 302 flow. For example, the piercing element 336 can include a tube with a central channel, or can be arranged as a spike, blade, rod or other structure arranged so beverage material 302 can flow along an outer surface of the piercing element 336.

The closure can also include a gas inlet port arranged to conduct gas from the gas inlet port and into the interior space of the vessel. Introduction of pressurized gas into the vessel can help force the flow of beverage material from the vessel, e.g., where the beverage material is a syrup or if beverage material dispensing should be completed in a short period of time. The gas inlet port can be arranged to mate with a gas source of a beverage machine that provides pressurized air or other gas to the vessel. For example, as can be seen in FIG. 3, the gas inlet port in this embodiment includes an annular groove 337 formed on a bottom side of the movable element 335 and one or more gas openings 338 through the movable element 335 to conduct gas from the annular groove 337 to an upper side of the movable element 335. As is discussed in more detail below, providing an annular groove 337 or other rotationally symmetric feature to receive pressurized gas can make the container 300 insensitive to its rotational positioning when placed in a container receiver of a beverage machine. In this embodiment, pressurized gas introduced into the annular groove 337 can be conducted through the one or more gas openings 338 and into the vessel 301.

Figure 4:
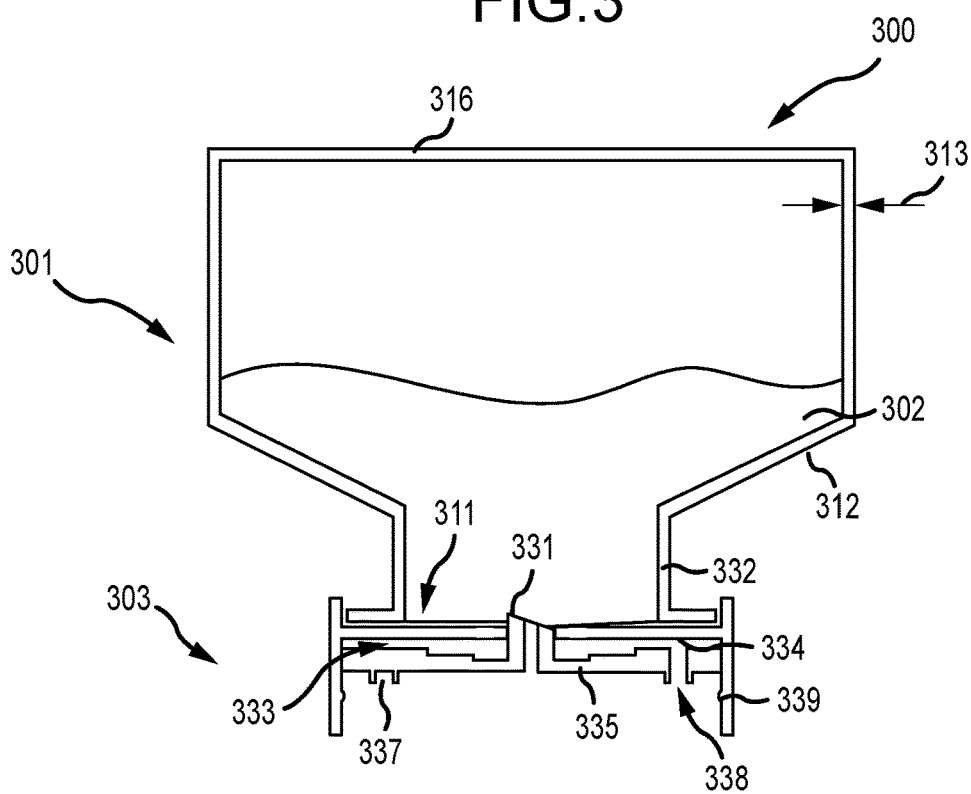
FIG. 4 depicts the beverage container of FIG. 3 with a moveable element in an upper position.

With reference to FIG. 4, the movable element 335 can be moved upwardly so that the piercing element 336 penetrates the membrane 331, thus providing access to the internal space of the vessel 301. Pressurized gas passing through the gas opening(s) 338 can enter a space between the movable element 335 and the membrane 331, and in this embodiment, can pass through a space between the membrane 331 and an exterior of the piercing element 336 while the piercing element is extended through the membrane 331. Introduction of gas into the vessel 301 can increase a pressure in the vessel 301 relative to an external environment, which tends to force beverage material 302 to exit the vessel 301. In this embodiment, the piercing element 336 includes a channel, and beverage material 302 can exit the vessel 301 via the channel under the influence of pressure in the vessel 301. Increasing pressure in the vessel 301 by introducing pressurized gas can be particularly effective if the beverage material 302 is a liquid, such as a syrup or other concentrate, but can also provide benefits if the beverage material 302 is in a powder or other form. The piercing element 336 can include one or more grooves on its exterior surface to help conduct gas flow into the vessel 301, but such features are not necessary and gas can simply pass through any gap between the piercing element 336 and the membrane 331.

Figure 5:
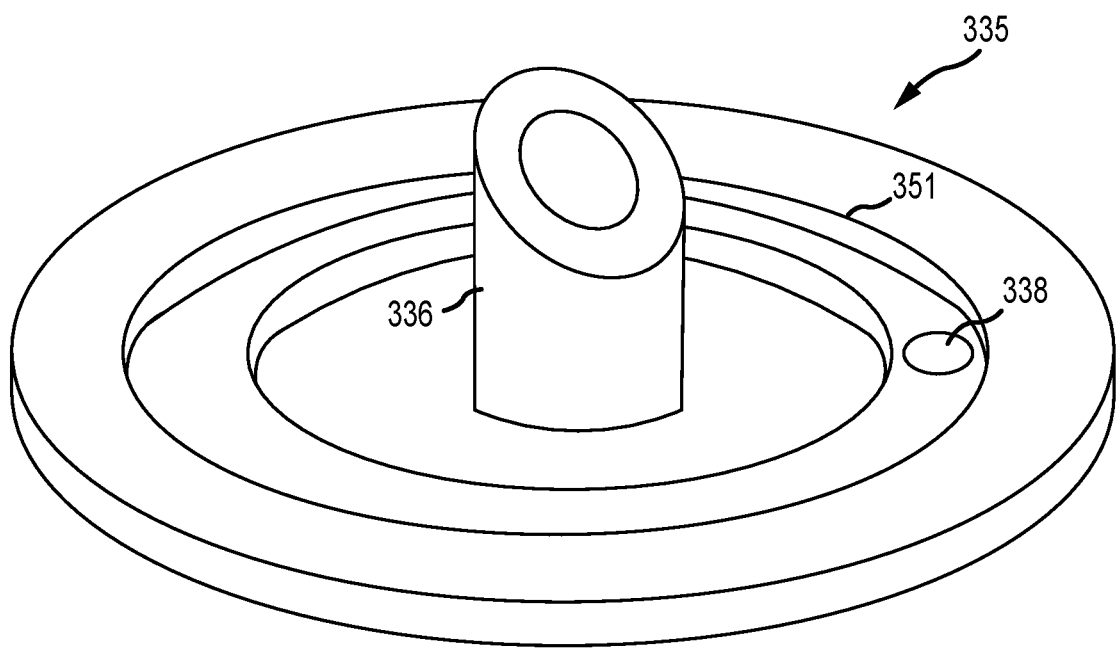
FIG. 5 depicts a top perspective view of a sample moveable element.
Figure 6:
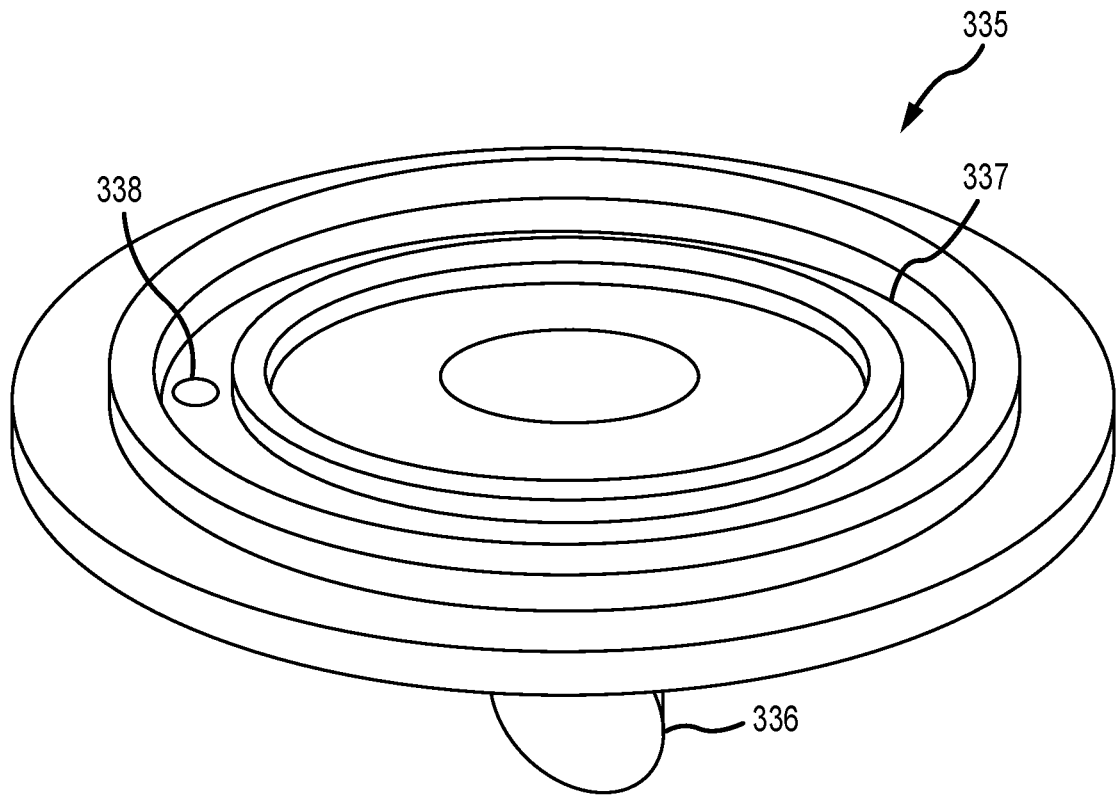
FIG. 6 depicts a bottom perspective view of the sample moveable element of FIG. 5.

With reference to FIGS. 5 and 6, perspective top and bottom views of the movable element 335 in the FIGS. 3 and 4 embodiment are shown. As can be seen in FIG. 5, a top side of the movable element 335 includes one or more standoffs 351. The standoff 351 in this embodiment is arranged as a ring around a periphery of the movable element 335, and as can be seen in FIG. 4, helps maintain a gap or air space between the movable element 335 and the ledge 334 when the movable element 335 is moved upwardly. This air space provides a flow path for gas passing through the gas opening(s) 338 and to the vessel 301. Although in this embodiment the standoff 351 is arranged as a ring with a groove positioned inwardly of the ring, the standoff 351 could be arranged in other ways. For example, the standoff 351 could include one or more upstanding pins, one or more radially oriented grooves, or other features to provide a flow path for gas at an upper surface of the movable element 335.

As can be seen in FIG. 6, the annular groove 337 is formed by concentric walls that extend downwardly from the movable element 335. Of course, the annular groove 337 could be formed in other ways, such as by a groove or channel that is formed in the movable element 335. The annular groove 337 is not required, however, and can be eliminated and one or more gas openings 338 used alone. In such case, the beverage machine can include an annular channel or other port that supplies pressurized gas to the gas opening 338.

In some embodiments, the closure 303 can include a detent arranged to maintain the movable element at a first position in which the membrane is not pierced by the piercing element, and at a second position in which the membrane is pierced by the piercing element. The detent can prevent piercing of the membrane unless a specific amount of force is applied to move the movable element in the closure. Thus, the detent can help prevent unwanted piercing of the membrane, e.g., by a user accidentally pressing on the movable element. The embodiment illustrated in FIGS. 3 and 4 includes a detent arranged as a protrusion 339 that extends inwardly from the inner wall of the closure body 332. When the movable element 335 is located below the protrusion 339 (FIG. 3), the protrusion 339 resists upward movement of the movable element 335 unless a threshold level of force is applied, e.g., 5 to 10 pounds of force or more. When the threshold level of force is applied to the movable element 335, the movable element 335 will move from a first, lower position past the protrusion 339 to a second, higher position in the pathway 333 (FIG. 4). The detent can keep the movable element 335 in the second position, helping to keep the piercing element 336 engaged with the membrane 331.

This can aid in providing gas flow into, and beverage material flow out of, the vessel 301, and/or help signal to a user that the container 300 has been used to form a beverage. That is, after a container 300 is used to form a beverage, it may not be readily obvious from other portions of the container 300 that the container 300 has been used. However, by viewing the closure 303, and specifically the position of the movable element 335, a user can easily determine that the container 300 has been previously used. While in this embodiment the detent is formed as a ring-shaped protrusion 339 that extends inwardly from an inner wall of the closure body 332, other arrangements are possible. For example, the detent can be formed by discrete tabs or pins that extend from the inner wall of the body 332, as a groove or series of grooves in the inner wall of the body 332 in combination with a ring-shaped protrusion or other elements on the movable element 335 that cooperate with the groove(s), or other detent configurations.

It should also be appreciated that other arrangements for controlling the movement of the movable element 335 can be employed. For example, the movable element 335 can engage the inner wall of the closure body 332 by a screw thread or cam/cam follower engagement such that the movable element 335 must be rotated to move the movable element 335 toward the membrane 331. In one embodiment, the thread or cam engagement can be configured so that a 90 degree rotation of the movable element 335 relative to the body 332 can move the movable element 335 so that the piercing element 336 pierces the membrane 331 to allow beverage material 302 to exit. Rotation of the movable element 335 or of the closure body 332 can be effected by the beverage machine or by a user, such as by rotating the vessel 301. For example, the movable element 335 can have a tab or other feature that engages with a cartridge receiver so that the movable element 335 remains stationary as the vessel 301 is rotated by a user. This rotation can cause piercing of the membrane 331 to allow access to the interior of the container 300.

Figure 7:
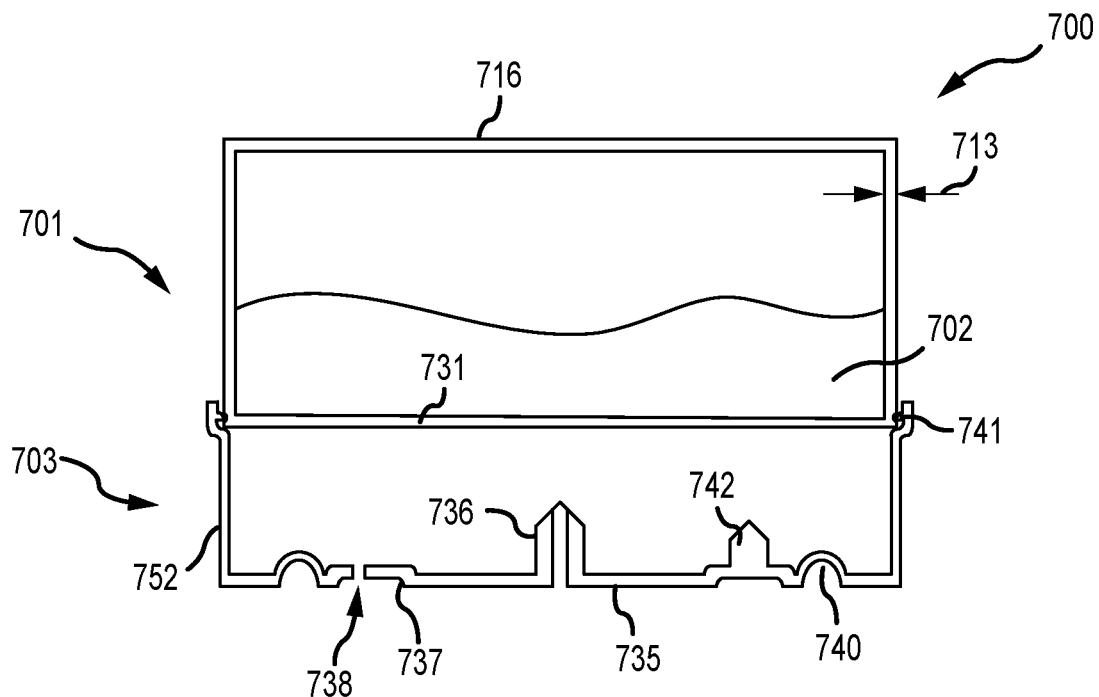
FIG. 7 depicts a cross-sectional view of another embodiment of a beverage container.
Figure 8:
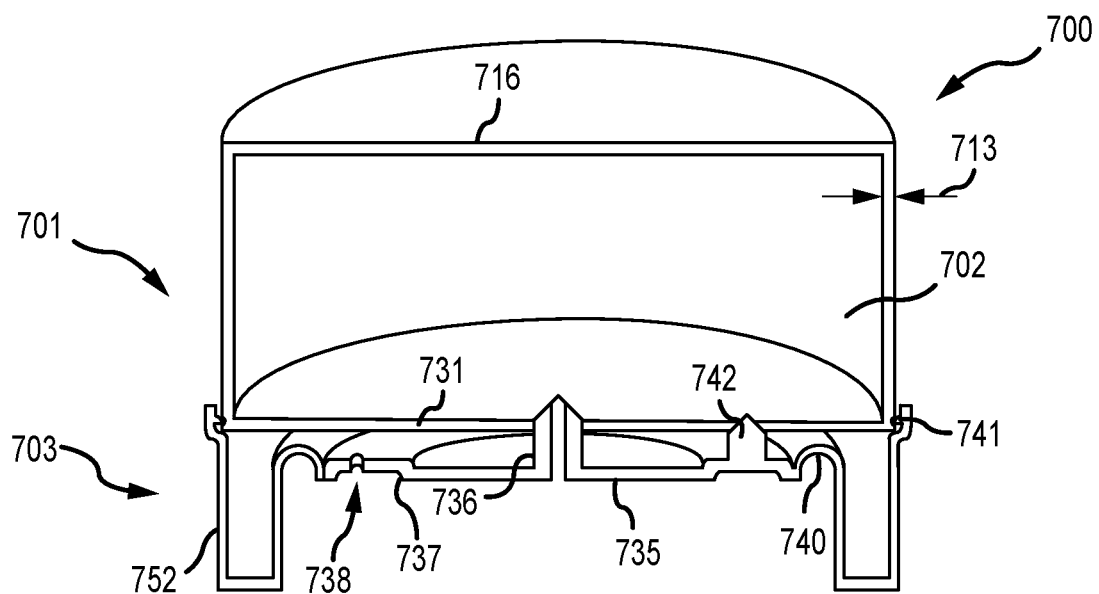
FIG. 8 depicts a perspective cross-sectional view of the beverage container of FIG. 7.

FIGS. 7 and 8 depict another embodiment of a beverage container that incorporates one or more features of the present exemplary systems and methods. In particular, FIGS. 7 and 8 show a container 700. The container 700 can be substantially analogous to the container 300. For example, the container 700 can include a sealed beverage material that is accessible by piercing a membrane that seals the beverage material with a moveable element. As such, the container 700 can include: a vessel 701, a beverage material 702, a closure 703, a bottom 712, a sidewall 713, a top 716, a membrane 731, a closure body 732, a moveable element 735, a piercing element 736, an annular groove 737, and a gas opening 738, redundant explanation of which is omitted here for clarity.

Notwithstanding the foregoing similarities, in the embodiment of FIGS. 7 and 8, the closure 703 is arranged to engage with the vessel 701 by way of a snap fit. Alternatively, as noted above, the closure 703, or any closure described herein, can engage the vessel 701 by any securing mechanisms including, but in no way limited to, by welding, an adhesive, threaded engagement, etc. An upper end of the closure body 732 includes an engagement feature 741, such as a tooth or other type of engagement feature that engages with a corresponding tooth or other engagement feature on the vessel 701, near the opening 711. In this embodiment, the closure body 732 can be pressed onto the vessel 701 so that the engagement feature 741 engages with the vessel 701 to hold the closure 703 on the vessel 701. The engagement feature 741 can also clamp the membrane 731 between the closure body 732 and the vessel 701, so as to seal the internal space of the vessel closed. Alternately, the membrane 731 can be attached directly to the vessel 701 or the body 732, e.g., by welding or an adhesive. The engagement feature 741 can provide a tamper-evident engagement that resists removal of the closure 703 from the vessel 701, and if the closure 703 is removed from the vessel 701, the engagement feature 741 and/or other portions of the closure 703 or the vessel 701 can break or otherwise deform or be altered so as to prevent re-engagement of the closure 703 with the vessel 701.

Also present in FIGS. 7 and 8, the embodiment is a flexible connector 740 between the movable element 735 and the body 732 of the closure. In this embodiment, the flexible connector 740 includes an annular diaphragm having a U-shaped cross-section in a radial direction. Such an arrangement is at least sometimes called a rolling diaphragm, and connects to the movable element 735 at an inner side of the diaphragm and at an outer side to the body 732. This arrangement allows the movable element 735 (in this case including a disc) to move relative to the body 732 while remaining attached to the body 732. This seal can help direct flow of beverage material 702 to and through the piercing element 736 or other desired flow path. Presence of the flexible connector 740 allows for a one-piece construction of the closure 703 and allows for the translation of the movable element without separation of the one-piece construction. This configuration allows for the functional translation due to the geometry of the closure 703, a configuration that is known as a compliant mechanism. When a force is input on the moveable element 735, the movable element 735 translates as the flexible connector deforms and allows for the translation. The flexible connector 740 can allow for deformation and thereby translation of the moveable element 735 by having a thinner cross-section compared to the rest of the closure 703, by being formed of a separate and more flexible material, and the like. Note also that this embodiment includes no standoff feature. In this embodiment, the flexible connector 740 limits upward movement of the movable element 735 so that the upper surface of the moveable element 735 does not contact the membrane 731, or the flexible connector 740 can interfere with the membrane 731 to help maintain a suitable gap between the movable element 735 and the membrane 731, to allow gas flow into the vessel 701.

Another feature shown in FIGS. 7 and 8 is that the movable element 735 includes an inlet piercing element 742 arranged to pierce the membrane 731 with movement of the movable element 735 toward the membrane 731 to introduce gas into the internal space of the vessel 701. Similar to the piercing element 736, the inlet piercing element 742 extends upwardly from the movable element 735, e.g., the disc, and can form a hole in the membrane 731 through which gas provided to the gas supply port (e.g., the annular groove 737 and gas openings 738) can flow. The piercing element 736 and inlet piercing element 742 can be arranged so that the piercing element 736 pierces the membrane 731 first as the movable element 735 is moved toward the membrane 731. This way, if there is a pressure inside the vessel 701 that exceeds an ambient pressure, beverage material 702 will flow through the opening formed by the piercing element 736, rather than the hole formed by the inlet piercing element 742.

Figure 9A:
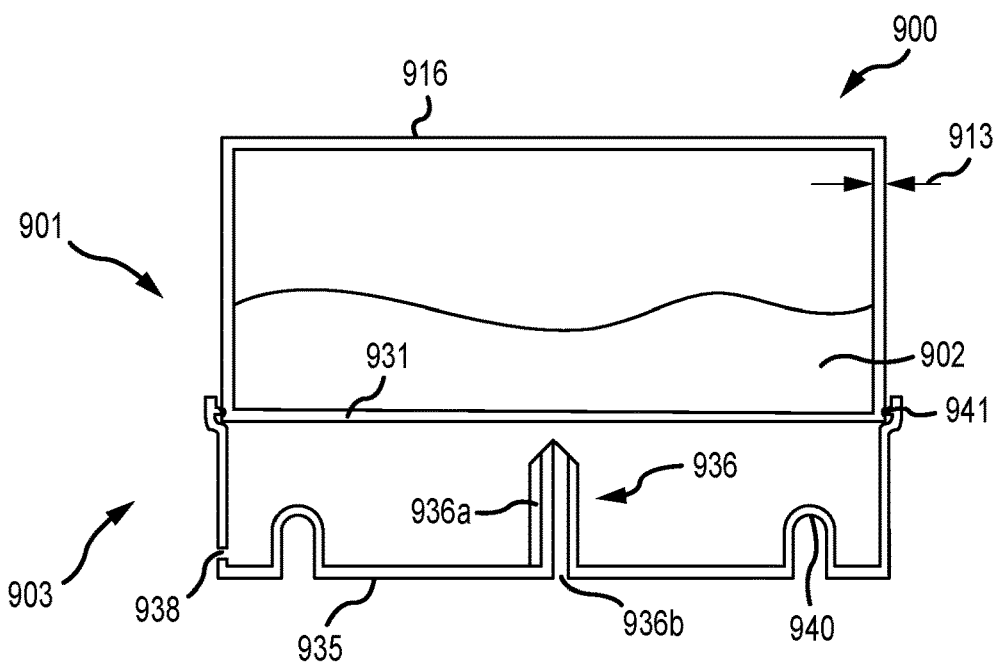
FIG. 9A depicts a cross-sectional view of another embodiment of a beverage container in a first configuration.
Figure 9B:
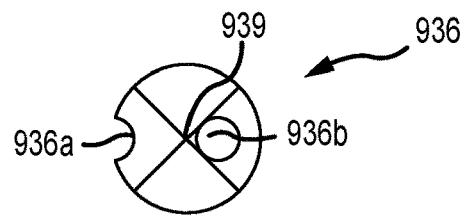
FIG. 9B depicts a top view of a piercing element.
Figure 10:
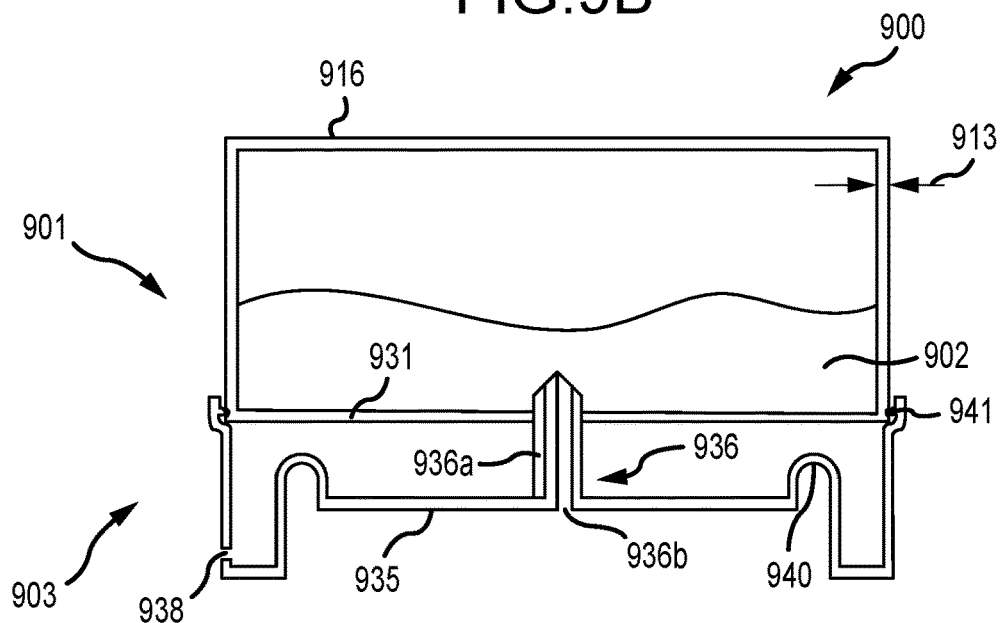
FIG. 10 depicts a cross-sectional view of the beverage container of FIG. 9A in a second configuration.

FIGS. 9A-10 depict another embodiment of a beverage container that incorporates one or more features of the present exemplary systems and methods. In particular, FIGS. 9A-10 show a container 900. The container 900 can be substantially analogous to the container 300, 700, and/or any other container described herein. For example, the container 900 can include a sealed beverage material that is accessible by piercing a membrane that seals the beverage material with a moveable element. As such, the container 900 can include: a vessel 901, a beverage material 902, a closure 903, a bottom 912, a sidewall 913, a top 916, a membrane 931, a closure body 932, a moveable element 935, a piercing element 936, and a gas opening 938, and flexible connector, redundant explanation of which is omitted here for clarity.

Notwithstanding the foregoing similarities, the piercing element 936 is configured to advance at least partially through the membrane 931 and define an inlet path and an outlet path into an internal space of the vessel 901. In this regard, the closure 903 can generally form a single opening through the membrane 931 that allows for both the introduction of pressurized gas into the internal space and for the exit of beverage material.

To facilitate the foregoing, the piercing element 936 can include two passages. As shown in FIGS. 9A and 9B, the piercing element 936 can include a first passage 936a and a second passage 936b. The first passage 936a and the second passage 936b cooperate to define respective inlet and outlet paths for the internal space defined by the vessel 901. For example, the first passage 936a can be fluidically coupled to a gas inlet of the vessel 901 (e.g., such as the gas opening 938) and help direct a supply of pressurized gas form the gas opening 938 to the internal space. The second passage can be fluidically separated from the gas inlet (e.g., by a body or mass of the piercing element 936) and can be configured to help direct a supply of the beverage material 902 from the vessel 901.

In a particular example, the piercing element 936 can be an elongated featured having a sharp projection 939. The sharp projection 939 can be arranged at an apex of the piercing element 936 can be sufficiently durable and resilient to puncture the membrane 931 upon advancement toward the internal space of the vessel 901. In this embodiment, the first passage 936a and the second passage 936b can be defined by the piercing element 936 in a manner to define the inlet path and the outlet path described herein.

To illustrate, FIG. 9B shows the first passage 936a as a blind recess. The blind recess can be an indent, a groove, or other feature defined along an exterior of the piercing element 936. This blind recess can extend along some or all of the length of the piercing element 936. The blind recess can be defined by a concave surface of the piercing element, however, in other cases, other combinations are possible. As such, when the piercing element 936 moves into the internal space, pressure gas can be directed from the gas opening 938, along an exterior of the piercing element (and at least partially within the blind recess).

The elongated feature defining the piercing element 936 can also help define an outlet path. For example, FIGS. 9A and 9B show the second passage 936b as being an elongated lumen. The elongated lumen extends through a body of the piercing element 936 and to an outlet of the beverage container 904 for beverage material exit. The elongated lumen can be a substantially cylindrical feature. However, in other cases, other contours are possible. In order to facilitate piercing of the membrane 931, the second passage 936b can be offset from the apex (e.g., sharp projection 936); however, this is not required. The second passage 936b is separated from the first passage 936a, and as such, the piercing element 936 is configured to define each of the inlet path and outlet path through the membrane 931 for the internal space of the vessel 901.

For example, with reference to FIG. 10, the moveable element 935 is shown in an advanced or actuated positioned. In the advanced or actuated position, the piercing element 936 is positioned through the membrane 931 and at least partially within the internal space of the vessel 901. As shown in the configuration of FIG. 10, the first passage 936a is fluidically coupled with the gas opening 938. Pressurized gas can therefore be provided to the gas opening 938 and flow into the internal space of the vessel 901 via the first passage 936a. A body or mass of the piercing element 936 can separate the first passage from the second passage 936b. The second passage 936b, shown in FIG. 10, extends through the body of the piercing element and as such, defines a separate outlet from the internal space of the vessel 901.

FIGS. 11-14 depict various embodiments of the beverage containers described herein with sample illustrations of a beverage machine or appliance. In particular, various beverage containers are shown in a configuration in which the container is received by a beverage machine and the machine manipulates the container for access to a sealed beverage material. It will be appreciated that while sample mechanical components are illustrated to depict one or more operations of the beverage machine, other components are contemplated herein to perform the various functions of the beverage machine, as described in greater detail below.

Figure 11:
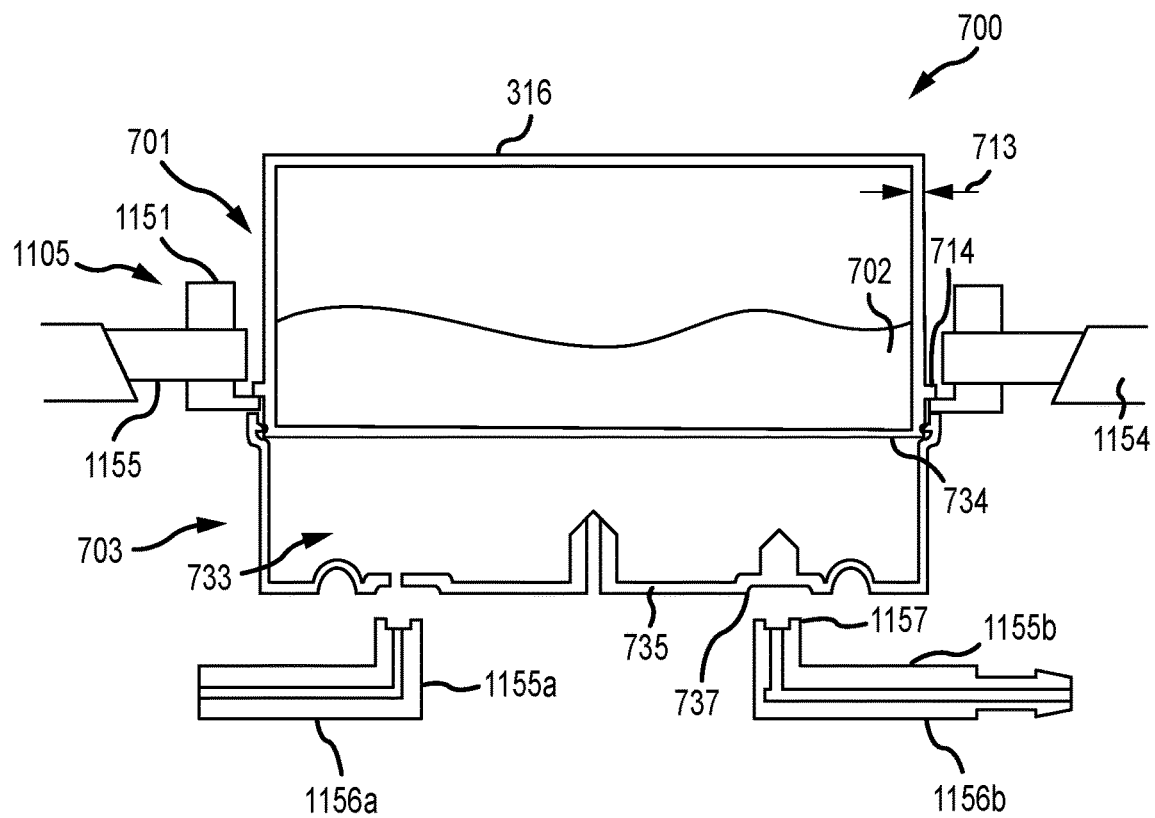
FIG. 11 depicts a cross-sectional view of the beverage container of FIG. 7 held by a container receiver of a beverage appliance.
Figure 12:
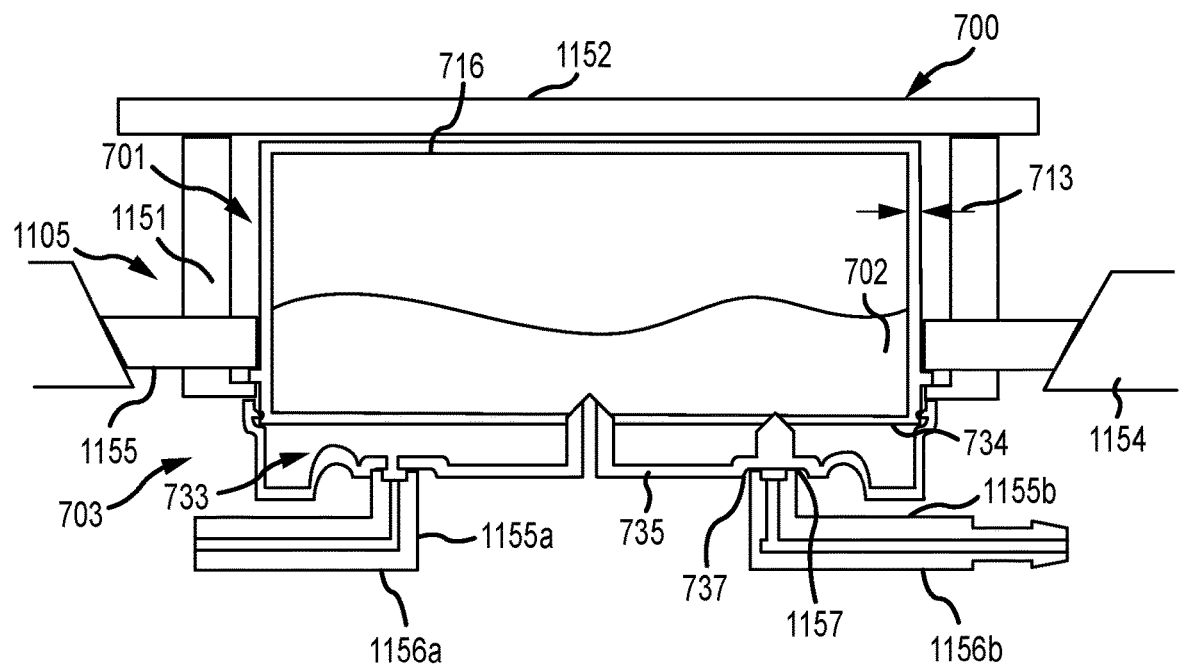
FIG. 12 depicts the beverage container of FIG. 7 enclosed within the beverage appliance and engaged with an anvil.

As one example, FIGS. 11 and 12 show the container of FIGS. 7 and 8 engaging with a container receiver of a beverage machine. In this embodiment, the container receiver 1105 includes a basket 1151 into which the container 700 can be placed. The basket 1151 is mounted to move vertically, and is spring biased upwardly to the position shown in FIG. 11. The spring bias on the basket 1151 is sufficiently robust to support the weight of the container IO, and so the container IO and basket 1151 remain in the position shown in FIG. 11, until the container receiver 1105 is closed.

When the container receiver 1105 is closed, a lid 1152 can press downwardly on the basket 1151, forcing the basket 1151 to move downwardly against the spring bias. Downward movement of the basket 1151 causes clamp elements 1153 to move inwardly against a spring bias that normally urges the clamp elements 1153 to move outwardly. However, downward movement of the basket 1151 and the clamp elements 1153 which are mounted to the basket 1151 causes outer ends of the clamp elements 1153 to ride along an inclined surface 1154 that pushes the clamp element 1153 inwardly. This allows the clamp element 1153 to capture a flange 714 of the vessel 701 so that the flange 714 is trapped between a lower portion of the basket 1151 and the clamp elements 1153.

Continued downward movement of the basket 1151, clamp elements 1153, and the captured container 700 causes the moveable element 735 to contact an anvil 1155 of the container receiver 1105, which moves the moveable element 735 upward so that the piercing element 736 and the inlet piercing element 742 pierce the membrane 731. The moveable element 735 also engages the anvil 1155 so that the annular groove 737 sealingly engages with the anvil 1155 so that pressurized gas can be delivered by one or more gas supplies 1156a, 1156b to the gas inlet port and into the vessel 701. This causes beverage material 702 to exit the vessel 701 via the piercing element 736, e.g., a channel in the piercing element 736, for direct dispensing into a user's cup or into a mixing chamber for mixing the beverage material 702 and water or other liquid. After dispensing of the beverage material 702, the lid 1152 can be lifted, allowing the spring bias on the basket 1151 to move the basket 1151 upwardly and the clamp element 1153 to move outwardly to release the container 700. In this embodiment, an annular groove 1157 in an upper surface of the anvil 1155 that is arranged to mate with the annular groove 737 of the movable element 735. However, this is not necessary, and the gas supply 1156 can include one or more holes in the upper surface of the anvil 1155 to deliver pressurized gas to the vessel 701.

It should be understood that a container receiver 1105 is not necessarily limited to the embodiments described herein. For example, the container receiver 1105 can open and close in any suitable way to allow container 700, or a variety of other containers described herein, to be placed in and/or removed from the container receiver 1105. In one embodiment, a container receiver 1105 can include a lid pivotally mounted to a receiver or basket portion of the container receiver 1105, and can be opened and closed manually, such as by a handle and linkage arrangement, or automatically, such as by a motor drive, to close the container receiver 1105. Of course, the lid 1152 can be arranged in other ways, such as being engaged with the lower portion by a threaded connection (like a screw cap), by the moving the basket portion relative to the lid while the lid remains stationary, by both the lid and basket portion moving, and so on. In addition, a container receiver 1105 need not necessarily have a lid and basket arrangement, but instead can have any suitable member or members that cooperate to open/close and support a container. For example, a pair of clamshell members can be movable relative to each other to allow receipt of a container and physical support of the container. Some other illustrative container holder arrangements are shown, for example, in U.S. Pat. Nos. 6,142,063; 6,606,938; 6,644,173; and 7,165,488.

Figure 13:
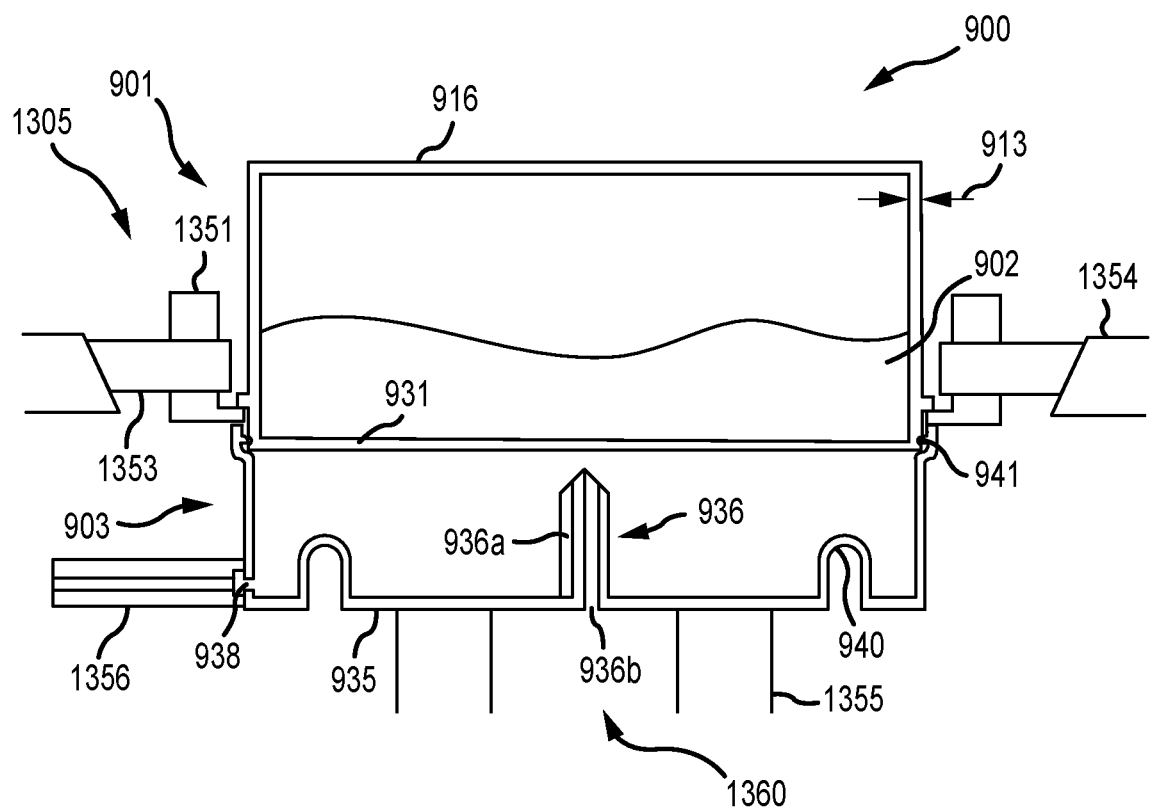
FIG. 13 depicts a cross-sectional view of the beverage container of FIG. 9 held by a container receiver of a beverage appliance.
Figure 14:
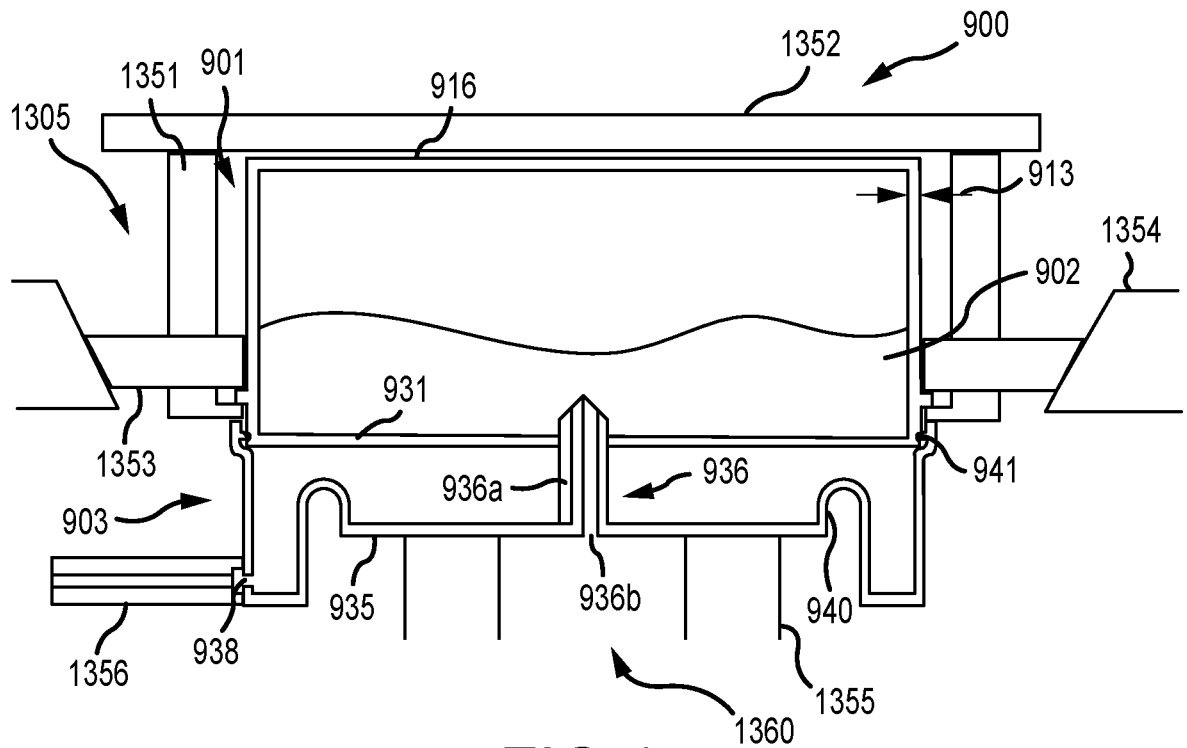
FIG. 14 depicts the beverage container of FIG. 9 enclosed within the beverage appliance and engaged with an anvil.

As another example, FIGS. 13 and 14 show the container of FIGS. 9A-10 engaging with a container receiver of a beverage machine. In particular, FIGS. 13 and 14 show the container 900 engaging with a container receiver 1305. The container receiver 1305 can be substantially analogous to the container receiver 1105, described with respect to FIGS. 11 and 12. For example, the container receiver 1305 can be configured to hold the container 900 and manipulate a moveable piercing element of the container 900, thereby allowing for access to sealed beverage material inside of the container 900. As such, the container receiver 1305 can include or be associated with: a basket 1351, a lid 1352, a clamping element 1353, an inclined surface 1354, an anvil 1355, and a gas supply, redundant explanation of which is omitted here for clarity.

With reference to FIG. 13, and substantially analogous to the system described with respect to FIGS. 11 and 12, the container receiver 1305 includes an anvil 1355. In the received position of FIG. 13, the anvil 1355 engages the beverage container 900 and causes the beverage container 900 to release beverage material 902 held within. The container receiver 1305 also includes or is associated with the gas supply 1356. The gas supply operates to deliver a supply of gas to the beverage container 900, which can be used to pressurize the beverage material and facilitate rapid exit of the beverage material 902 from the beverage container 900.

With reference to FIG. 14, the beverage container 900 is sealed or otherwise and enclosed within the container receiver 1305. In particular, the beverage container 900 is sealed or enclosed within the container receiver in a configuration in which the container receiver 1305 is an in actuated state for access to the beverage material held by the beverage container 900. For example, as shown in FIG. 14, the anvil 1355 is depicted in an advanced or actuated position, in which the anvil 1355 is moved toward the beverage container 900. The movement of the anvil 1355 can cause the moveable element 935 to advance toward the membrane 931, and as such, the piercing element 936 can advance at least partially into the internal space defined by the vessel 901.

In the advanced position shown in FIG. 14, the first passage 936a and the second passage 936b can be at least partially positioned within the internal space defined by the vessel 901. In particular, the first passage 936a and the second passage 936b can traverse a boundary defined by the membrane 931 and define respective inlet and outlet paths for the internal space. In this regard, a supply of pressurized gas can be provided to the beverage container 900, such as by the gas supply 1356. The supply of gas can travel within the closure 903 and be directed into the internal space by the first passage 936a. This can cause the beverage material 902 to pressurize at least partially within the vessel. In turn, the beverage material 902 can exit the internal space via the second passage 936b that is defined through a body of the piercing element 936. In some cases, the beverage material can be routed to an exit of the beverage container 900 for receipt by a beverage material intake of an associated beverage appliance.

Figure 15:
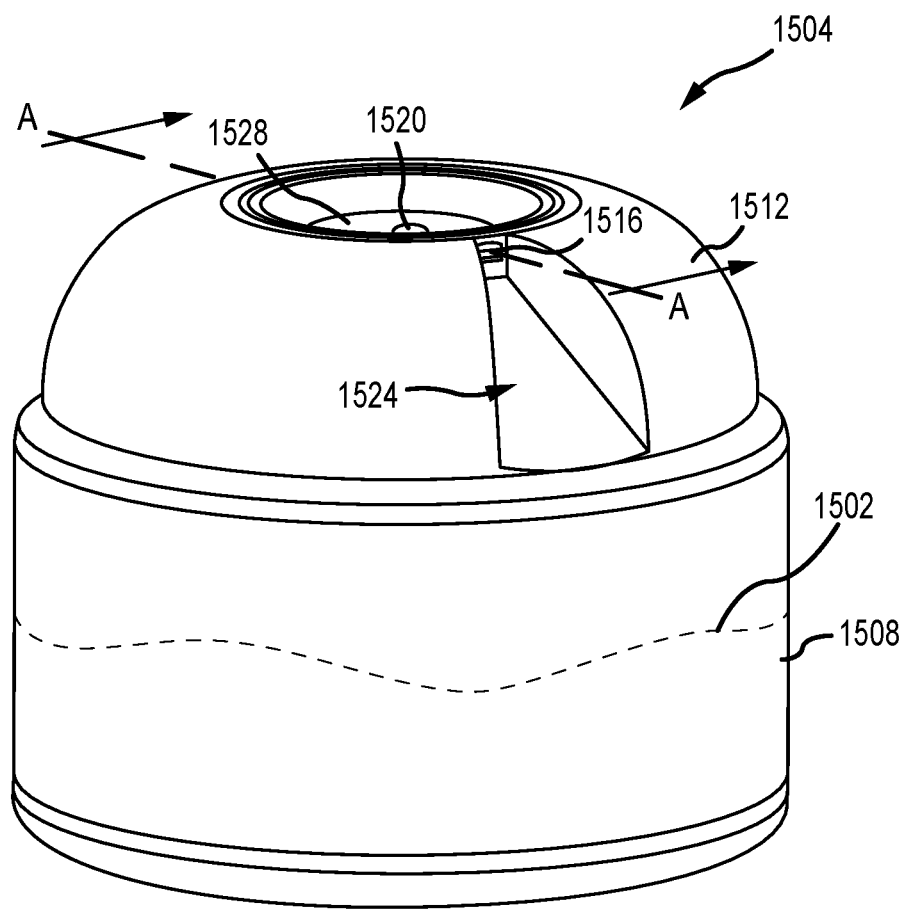
FIG. 15 depicts an isometric view of another embodiment of a sample beverage container.
Figure 16A:
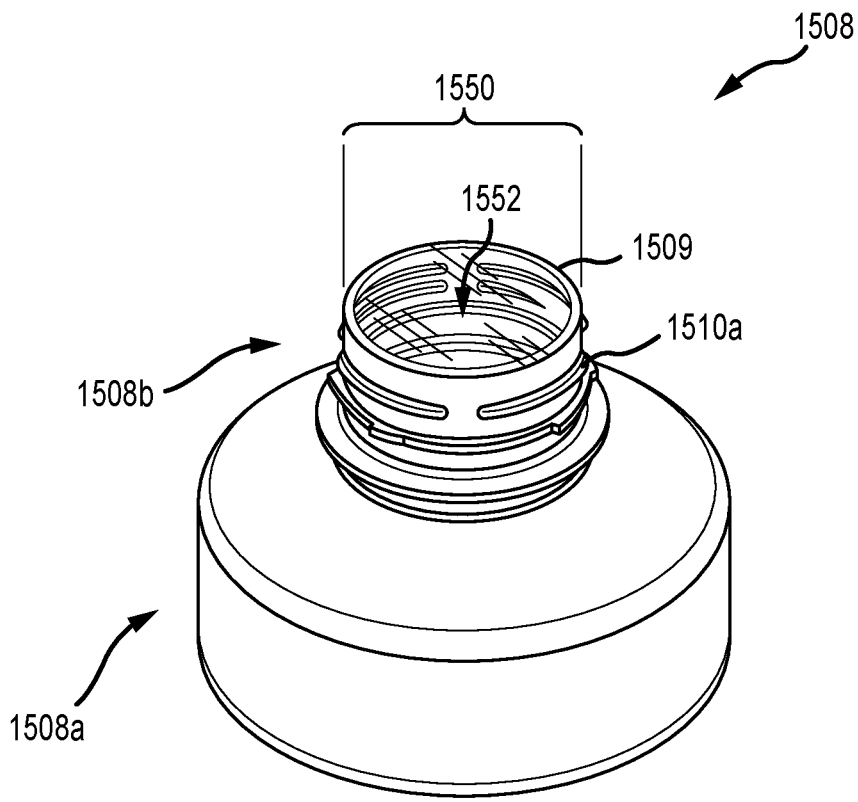
FIG. 16A depicts a body of the beverage container of FIG. 15.
Figure 16B:
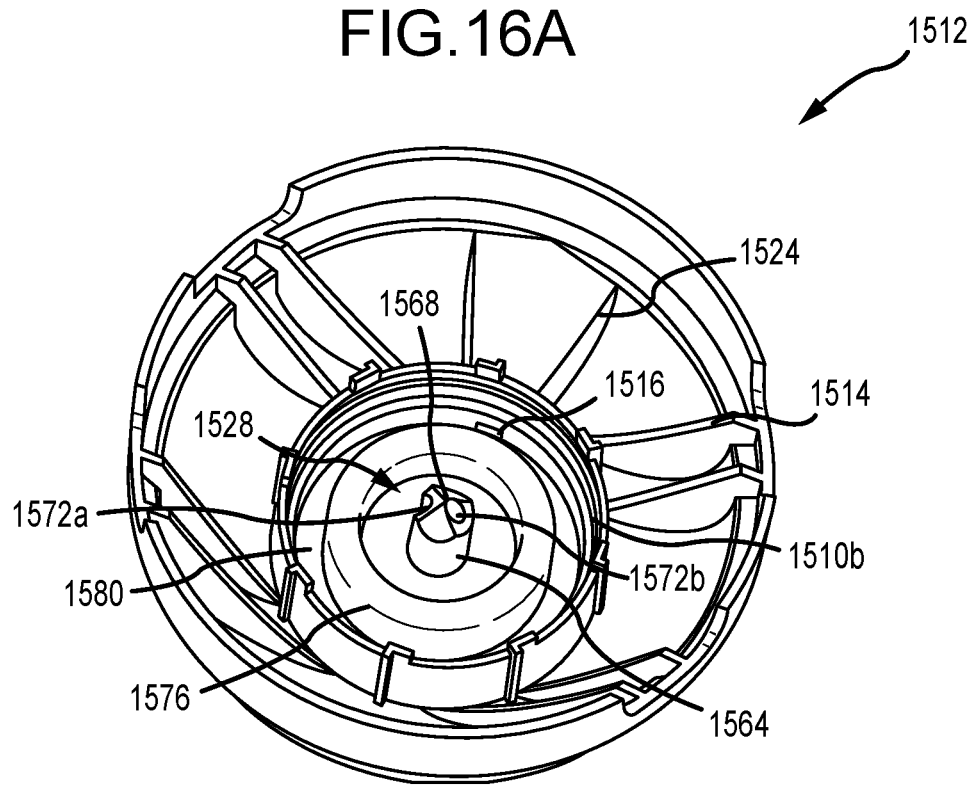
FIG. 16B depicts an enclosure of the beverage container of FIG. 15.
Figure 17:
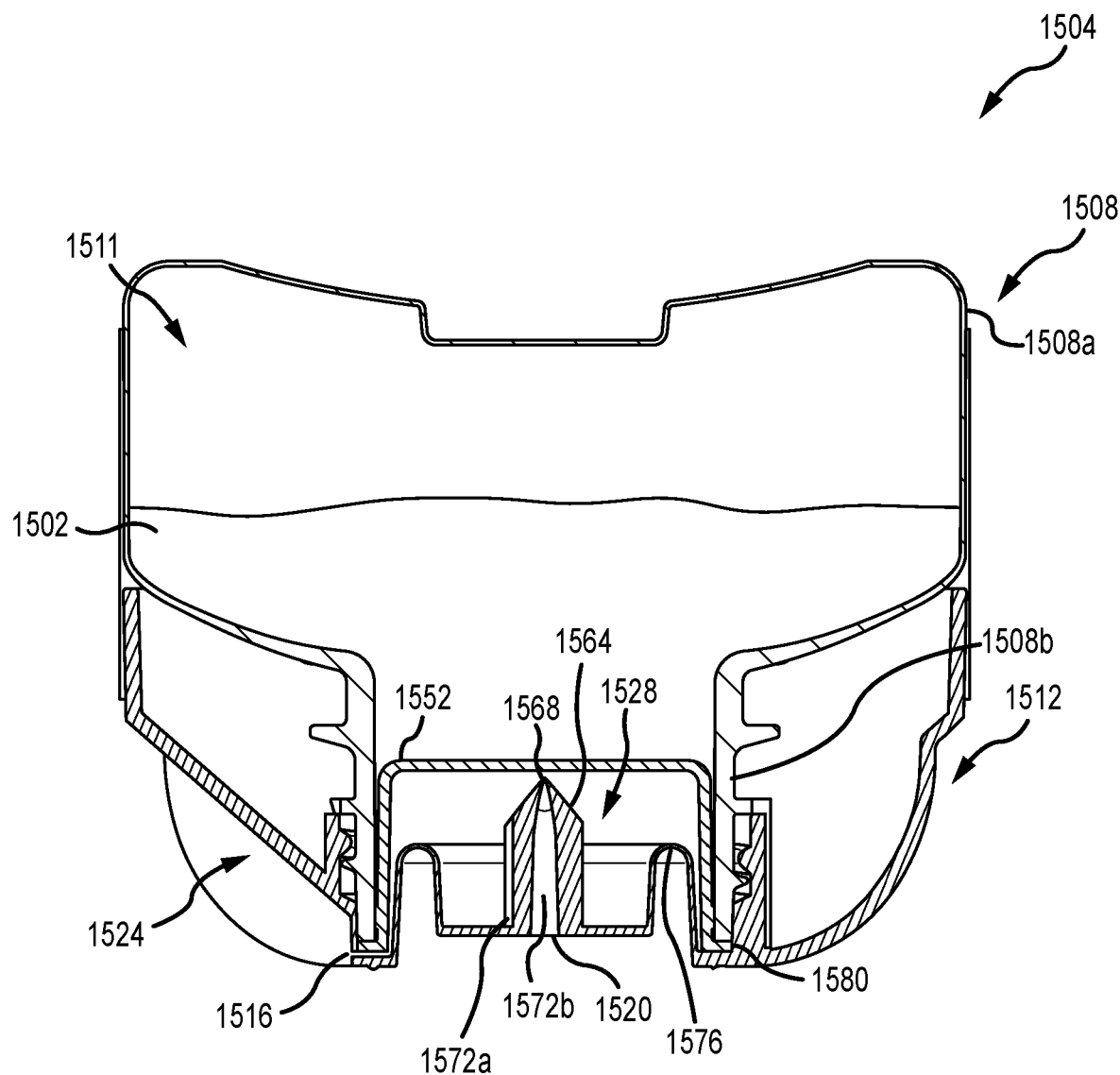
FIG. 17 depicts a cross-sectional view of the beverage container of FIG. 15, taken along line A-A of FIG. 15.

FIGS. 15-17 depict another embodiment of a beverage container that incorporates one or more features of the present exemplary systems and methods. In particular, FIGS. 15-16B depict a beverage container 1504. The beverage container 1504 can be substantially analogous to the various beverage containers, cartridges, pods, and so on described herein, such as the containers 204, 300, 700, and 900. For example, the beverage container 1504 can include a sealed beverage material that is accessible by piercing a membrane that seals the beverage material with a moveable element. As such, the beverage container 1504 can include: a beverage material 1502, a body 1508, an enclosure 1512, a moveable element 1528, a sealed region 1550, a membrane 1552, a piercing feature 1564, a first passage 1572a, a second passage 1572b, and flexible connector 1576, redundant explanation of which is omitted here for clarity.

With specific reference to FIG. 15, an isometric view of an exterior of the beverage container 1504 is shown. As described herein, the beverage container 1504 can be configured to hold a target volume of the beverage material 1502. The beverage container 1504 can further be configured for engagement for an associated beverage machine or appliance. Accordingly, the beverage container 1504 is shown in FIG. 15 to have a body 1508 defining a substantially cylindrical shape and holding a volume of the beverage material. The cylindrical shape can be tailored to hold the target volume of the beverage material. The cylindrical shape can also define one or more dimensions that facilitate receipt of the beverage container 1504 within the beverage appliance.

In the embodiment of FIG. 15, the beverage container 1504 can be configured for fluidic engagement with an associated beverage appliance via the enclosure 1512. For example, enclosure 1512 can define one or more openings, ports, conduits, and so on that are configured to be coupled with the beverage appliance. The beverage appliance can, in turn, introduce fluid to the beverage container 1504 (e.g., such as introducing pressurized gas) and/or receive material from the beverage container 1504 (e.g., such as the beverage material 1502) using the through portions defined by the enclosure 1512.

In the embodiment shown in FIG. 15, the enclosure 1512 can include an inlet 1516 and an outlet 1520. The inlet 1516 can be an inlet that is configured to receive a supply of pressurized gas from the beverage appliance. As shown in greater detail with respect to FIGS. 16A and 16B, the inlet 1516 can be fluidically connected to one or more internal structures of the enclosure 1512 that route the pressurized gas to the body 1508 (e.g., for pressurizing the beverage material 1502). The outlet 1520 can be an outlet that is configured for exit of the beverage material 1502 (or other fluids of, or within, the beverage container 1504). As shown in greater detail with respect to FIGS. 16A and 16B, the outlet 1520 can be fluidically connected to one or more internal structures of the enclosure 1512 that routes the beverage material 1502 from an internal space of the beverage container 1504 to, for example, an intake of the beverage appliance.

The enclosure 1512 can also include various other features that facilitate engagement of the beverage container 1504 with a beverage appliance. For example, the beverage container 1504 of FIG. 15 includes an alignment feature 1524. The alignment feature can be or include a notched or grooved portion along the exterior of the enclosure 1512. Positioned within the notched or grooved portion can be the inlet 1516; however, this is not required. Broadly, the alignment feature 1524 can help guide the beverage container 1504 into an appropriate position within a beverage appliance. This can help ensure proper connection between various fluidic coupling of the beverage appliance and the beverage container. For example, the alignment feature 1524 can be configured to receive a corresponding alignment feature of the beverage appliance. In turn, the mating of each of the alignment features can correspond to an aligned or fluidically coupled position between, for example, a gas supply of the beverage appliance and the inlet 1516 and/or an intake of the beverage appliance and the outlet 1520.

As described herein, the beverage container 1504 includes a moveable portion or element that is able to be advanced toward a sealed region for release of a beverage material. In the embodiment of FIG. 15, a moveable portion 1528 is shown. The moveable portion 1528 may, in certain embodiments, define an exterior surface of the enclosure 1512. For example, the moveable portion 1528 can define an exterior surface of the enclosure 1512 that is configured for engagement by a beverage appliance. For example, the moveable portion 1528 can be contacted by an anvil or other corresponding moveable element of the beverage appliance, which can cause the moveable portion 1528 to move inwards, toward the beverage material 1502, subsequently causing its release. In this regard, the moveable portion 1528 can define a substantially planar region or strike surface for contact with the anvil or other moveable structure of the beverage appliance. In other embodiments, other configurations are possible, including configurations in which the moveable portion 1528 defines an irregular or contoured surface that matches a correspondingly irregular or contoured surface of the anvil or moveable portion of the beverage appliance, for example, which can help associate the beverage container 1504 with a particular beverage appliance or the like.

The outlet 1520 is shown in FIG. 15 as being positioned within and through a section of the moveable portion 1528. This section can correspond to a piercing feature or the like within the enclosure 1512. In other cases, the outlet 1520 can be positioned off-set from a center of the moveable portion 1528 and/or away from or off-set from the moveable portion 1528, as can be appropriate for a given configuration.

With reference to FIG. 16A, the body 1508 of the beverage container 1504 is shown. The body 1508 of the beverage container 1504 is shown in a configuration in which the enclosure 1512 is removed. While the body 1508 can take many forms to facilitate the functionality described herein, the body 1508 of FIG. 16A includes a main portion 1508a and a neck portion 1508b. The main portion 1508a can be configured to hold a target volume of the beverage material 1502. The neck portion 1508b can also hold some of the beverage material 1502 and is configured to define an engagement structure that facilities connection of the enclosure 1512.

The neck portion 1508b can also define an opening or entrance into the internal space that holds the beverage material 1502. For example, the neck portion 1508b can include a rim 1509 at a top portion that defines an opening leading into the internal space. During manufacture or assembly, beverage material can be introduced into the body 1508 via the opening (e.g., through the rim 1509). In turn, the opening can be sealed in order to enclose and store the beverage material 1502 within the body 1508. For example, as shown in FIG. 16A, a membrane 1552 or other pierceable sheet can extend over the opening and thus define a sealed region 1550 over the area defined by the rim 1509. The membrane 1552, and sealed region 1550 more generally, can shield or protect the beverage material 1502 from an external environment, for example, until subsequent use by a beverage machine or appliance in producing a beverage.

The enclosure 1512, described in greater detail below with respect to FIG. 16B, can extend over the membrane and form a seal with the body 1508 about a perimeter of the opening (e.g., along the rim 1509). To facilitate the foregoing, the neck portion 1508b includes an engagement feature 1510a. The engagement feature 1510a can be threads that are configured for coupling with a corresponding engagement feature of the enclosure 1512. Once coupled with the body 1508 and positioned over the membrane 1552, the enclosure 1512 can operate to pierce the membrane 1552 and release the beverage material 1502, for example, in response to manipulation by a beverage machine or appliance.

For example, and with reference to FIG. 16B, the enclosure 1512 is shown. The enclosure 1512 of the beverage container 1504 is shown in a configuration in which the body 1508 is removed. While the enclosure 1512 can take many forms to facilitate the functionality described herein, the enclosure 1512 of FIG. 16B includes an attachment portion 1580 and the moveable portion 1528, described above. Generally, the attachment portion can be configured for engagement with the body 1508 of FIG. 16A. The attachment portion 1580 can be fixed relative to the body 1508 despite the operations of an associated beverage machine or appliance, whereas the moveable portion 1528 can move relative to the attachment portion 1580 and the body 1508, in response to one or more operation of the beverage machine.

To facilitate the foregoing, the attachment portion 1580 can include a variety of features that allow for connection of the enclosure 1512 to the body 1508. In the embodiment of FIG. 16B, the enclosure 1512 includes engagement features 1510b. The engagement features 1510b can include corresponding threads or other like features for mating with the engagement feature 1510a of the body 1508, described with respect to FIG. 16A. The attachment portion 1580 can define a substantially domed-shaped structure that fits over the membrane 1552 and sealed region 1550 more generally; however, other geometries are possible. In this regard, a section of the attachment portion 1580 can define the alignment feature 1525, the inlet 1516, and/or any other feature of the enclosure that is positioned about the rim 1509 when the enclosure 1512 is engaged with the body 1508. The attachment portion 1580 can generally be a hollow structure or cover. In this regard, to enhance structural stability, the attachment portion includes structural ribs 1514. In other cases, the attachment portion 1580 can include other members that enhance structural stability, including embodiments where some or all of the attachment portion is constructed from a substantially solid form.

As described above with respect to FIG. 15, the beverage container 1504 includes a moveable portion 1528. The moveable portion 1528 is moveable relative to the attachment portion 1580 and the body 1508 in response to one or more operations of an associated beverage appliance. In order to facilitate movement of the moveable portion 1528 relative to attachment portion 1580, the enclosure 1512 can include a flexible diaphragm 1576. The flexible diaphragm 1576 can be substantially analogous to the flexible connectors and diaphragms described herein, such as the flexible connectors 340 and 940 described above with respect to FIGS. 3 and 9. In this regard, the flexible diaphragm 1576 can be a compliant member that deforms in response to a force. The compliant member is connected to each of the attachment portion 1580 and the moveable portion 1528. As such, the moveable portion 1528 can receive a force (e.g., such as that from an anvil or other structure of a beverage appliance) that causes the moveable portion 1528 to advance toward the body 1508. As the moveable portion 1528 moves, the connected flexible diaphragm can stretch, deform, rotate, or elongate while remaining connected to the attachment portion 1580 (which is fixed to the body 1508). As such, an interior of the enclosure 1512 around the flexible diaphragm can remain shielded from an external environment despite the movement of the moveable portion 1528. This can be facilitated where, as shown in the example of FIG. 16B, the flexible diaphragm forms a ring around the moveable portion 1528, thereby promoting more uniform movement in response to operation of the beverage appliance.

The moveable portion 1528 can include a variety of components and structure that facilitate accessing beverage material held within the body 1508 of the beverage container 1504. In the example of FIG. 16B, a piercing feature 1564 is shown. The piercing feature 1654 can have an elongated body or otherwise be defined by an elongated protrusion having a sharp end portion 1568. The sharp end portion 1568 is configured for advancement through the membrane 1552 or other structure that forms a seal over the sealed region 1550 of the body 1504.

The piercing feature 1564 also includes the first passage 1572a and the second passage 1572b. Substantially analogous to the first passage 936a and the second passage 936b described with respect to FIGS. 9A-10, the first passage 1572a and the second passage 1572b allow the piercing feature to define discrete inlet and outlet paths through the membrane 1552 for the internal space of the body 1508. For example, as shown in FIG. 16B, the first passage 1572 can be a blind recess defined along an exterior of the body of the piercing feature. The second passage 1572b can be an elongated lumen extending through the piercing feature 1564.

The enclosure 1512 can be connected to the body 1508 and define a covered region over the sealed region 1550 of the body 1508. For example and with reference to FIGS. 16A and 16B, the engagement features 1510a and 1510b can be coupled to one another for attachment of the enclosure 1512 and the body 1508. As such, the region encompassed by (e.g. surrounded) the engagement features 1510b (e.g., threads) shown in FIG. 16B can define a boundary of the covered region. This covered region can help define a flow path into the internal space defined by the body 1508, for example, as described in greater detail below with respect to FIG. 17.

In one embodiment, the inlet 1516 can receive a supply of gas from an associated beverage appliance. The inlet 1516 can be fluidically connected (e.g., via the covered region) with the first passage 1572a. As such, the piercing features can be moved at least partially through the membrane 1552 and define an inlet path for the internal space via the first passage 1572a. The supply of gas can be directed into the internal space via the first passage 1572, for example, for pressurization of the beverage material held therein. The beverage material (including pressurized beverage material) can in turn exit the beverage container 1504 via the second passage 1572b. The second passage 1572b can be fluidically connected with the outlet 1520 (shown in FIG. 15), which can be engaged with a beverage material intake of the beverage machine.

As an illustration of the foregoing, FIG. 17 shows a cross-sectional view of the beverage container 1504 of FIG. 15 taken along line A-A. In the cross-sectional view, the body 1508 is attached to the enclosure 1512. In the attached configuration, the enclosure 1512 can be connected to the body 1508 about a perimeter of the sealed region defined, for example, by the membrane 1552. For example, the attachment portion 1580 of the enclosure 1512 can be connected to the neck portion 1508b of the body 1508. The connection of the neck portion 1508b and the attachment portion 1580 can define the covered region over the membrane 1552. In the embodiment shown in FIG. 17, each of the neck portion 1508b and the attachment portion 1580 include corresponding threads that are received by one another in order to form a seal. In other cases, other engagement structures are possible, including snap-fit connection, adhesives, foils, plastic welds, and so on.

By substantially sealing the enclosure 1512 to the body 1508, the enclosure 1512 can define one or more flow paths toward (or away from) the membrane 1552 and beverage material held thereby. For example, as shown in FIG. 17, the enclosure 1512 defines the inlet described above with respect to FIG. 15. In the cross-sectional representation of FIG. 17, the inlet 1516 is shown fluidically connected to an interior space between the moveable portion 1528 and the membrane 1552. As described above, the moveable portion 1528 includes a piercing feature 1564 having a first passage 1572 defining an elongated blind recess. Accordingly, upon movement of the piercing feature 1564 at least partially through the membrane 1552, the fluidic connection of the inlet 1516 and the interior space extends to the first passage 1572a and through the membrane 1552 and into an internal space 1511 of the beverage container 1504.

Also shown in FIG. 17, the second passage 1572b is defined through a body of the piercing feature 1564. It will be appreciated that upon movement of the piercing feature 1564 at least partially through the membrane 1552, the second passage 1572b defines an outlet path extending from the internal space 1511 through the membrane 1552 and to an exit of the beverage container 1504, such as the outlet 1520. The outlet 1520 can have a shape, contour, or other property that also provides for a substantially sealed connection between the beverage cartridge and an intake or other feature of an associated beverage machine. Accordingly, the beverage material 1502 (including pressurized beverage material) can flow through the second passage 1572b to the beverage machine for subsequent processing for beverage production, such as the various single-serve beverages described herein.

Figure 18A:
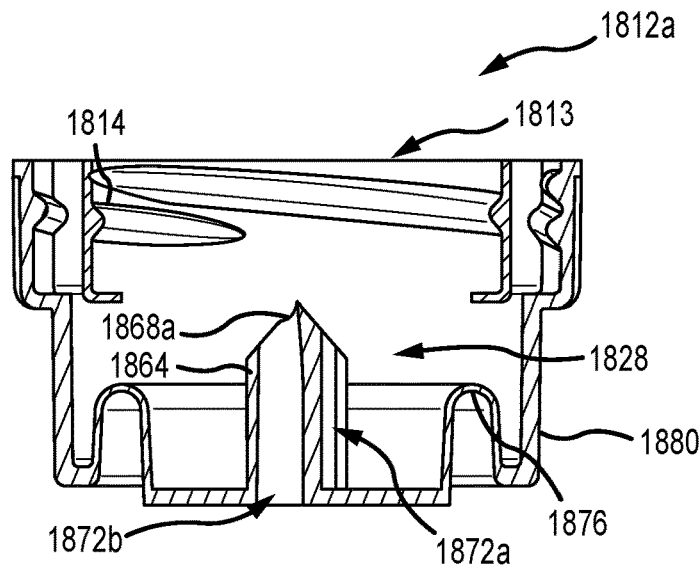
FIG. 18A depicts a cross-sectional view of an embodiment of an enclosure.
Figure 18B:
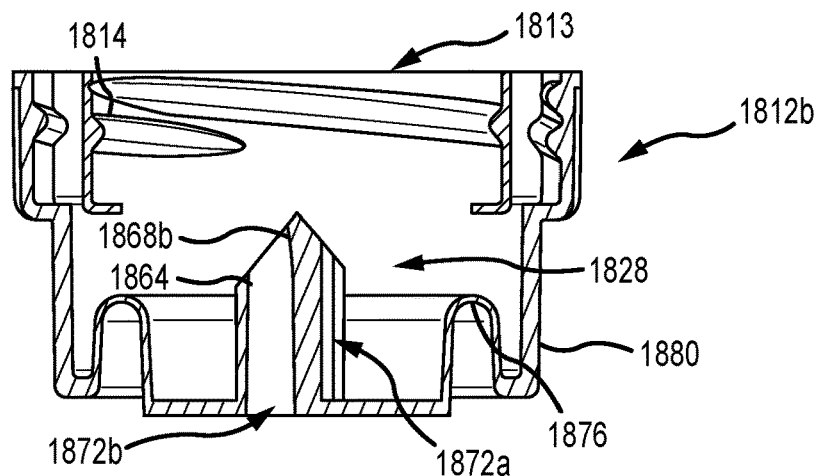
FIG. 18B depicts a cross-sectional view of another embodiment of an enclosure.
Figure 18C:
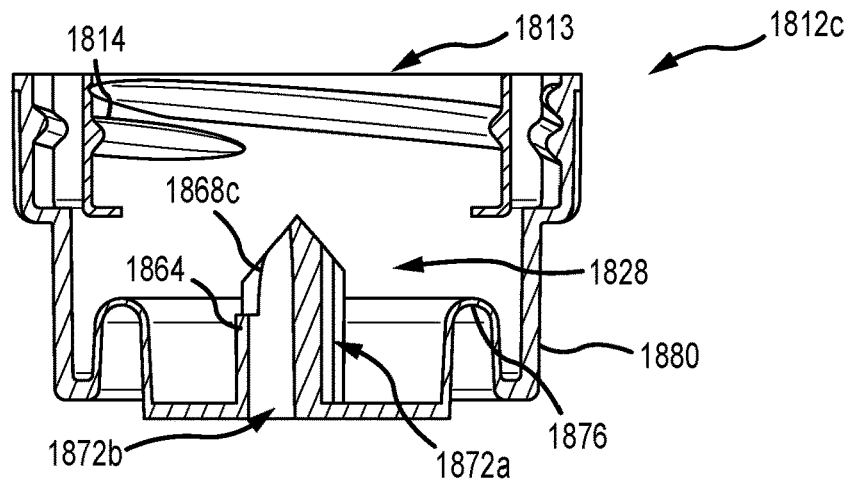
FIG. 18C depicts a cross-sectional view of another embodiment of an enclosure.

FIGS. 18A-18C depict embodiments of an enclosure. The enclosures of FIGS. 18A-18C can be used with or form a component of substantially any of the beverage containers described herein. In this regard, the enclosures of FIGS. 18A-18C can be substantially analogous to the enclosures, and closures, and so on described herein, such as the enclosure 1512 described above with respect to FIGS. 15-16B. As such, the enclosures shown in FIGS. 18A-18C can include: an engagement feature 1814, an attachment portion 1880, a moveable portion 1828, a piercing feature 1864, a flexible diaphragm 1876, a first passage 1872a, and a second passage 1872b, redundant explanation of which is omitted here for clarity.

With reference to FIG. 18A, an enclosure 1812a is shown. In the embodiment of FIG. 18A, the enclosure 1812 includes a receiving feature 1813 that is configured to receive and seat a body or other associated structure having a sealed beverage material. Arranged below the receiving feature 1813 is the piercing feature 1864. The piercing feature 1864 can be configured for advancement toward and into a region of the enclosure 1812 defined by the receiving feature 1813. As such, the receiving feature 1813 can receive a structure having the sealed beverage material, the piercing feature can extend into the structure for access to the sealed beverage material.

In the embodiment of FIG. 18A, the piercing feature 1864 is shown as having a sharp end portion 1868a. The sharp end portion 1868a can generally be arranged at an apex or end of an elongated portion of the piercing feature 1864. The sharp end portion 1868a can generally be configured to contact a membrane or other feature that seals the beverage material, and subsequently rupture or pierce membrane upon further movement toward the beverage material.

The sharp end portion 1864a shown in FIG. 18A can include a scalloped contour extended from or adjacent to an endmost point of the piercing feature 1864. In certain embodiments, the scalloped contour defined by the sharp end portion 1864a can facilitate puncture of the membrane, and subsequent direction of beverage material into the second passage 1872b. For example, the scalloped contour can enhance or exaggerate a point formed at the endmost point of the sharp end portion 1864 that helps form an initial puncture of the membrane. The scalloped contour can also help direct the punctured section of the membrane along a body of the piercing feature, thereby helping remove the punctured section from the outlet path defined by the second passage 1872b.

With reference to FIG. 18B, an enclosure 1812b is shown. The enclosure 1812b can be substantially analogous to the enclosure 1812a described with respect to FIG. 18A. Notwithstanding the similarities, the enclosure 1812b includes a sharp end portion 1868b. The sharp end portion 1868b can include an internal bowed section that defines a mouth of the second passage 1872b. The internal bowed section can facilitate beverage material exit upon puncture by the piercing feature 1864. For example, the contour of the bowed region can help define a flow path through the membrane that is less exposed to a punctured portion of the membrane. This can help produce, for example, a more unobstructed flow from the internal space holding the beverage material, in certain embodiments.

With reference to FIG. 18C, an enclosure 1812c is shown. The enclosure 1812c can be substantially analogous to the enclosure 1812a described with respect to FIG. 18A. Notwithstanding the similarities, the enclosure 1812b includes a sharp end portion 1868c. The sharp end portion 1868c can include a notched section that defines a mouth of the second passage 1872b. The notched section can facilitate beverage material exit upon puncture by the piercing feature 1864. For example, the notched section can increase a size of the opening of the second passage 1872b, and thereby help induce flow through the second passage 1872b.

It will be appreciated that the various sharp end portions described with respect to FIGS. 18A-18C are shown as separate embodiments for purposes of illustration. In other cases, one or more of the features of the sharp end portion 1868a, 1868b, 1868c can be combined, in a variety of combinations, in order to form a region of the piercing feature 1864 that maximizes rapid puncture and flow into the second passage 1872b. Accordingly, other embodiments and variations of sharp end portions of the piercing feature are contemplated within the scope of the present disclosure.

Figure 19A:
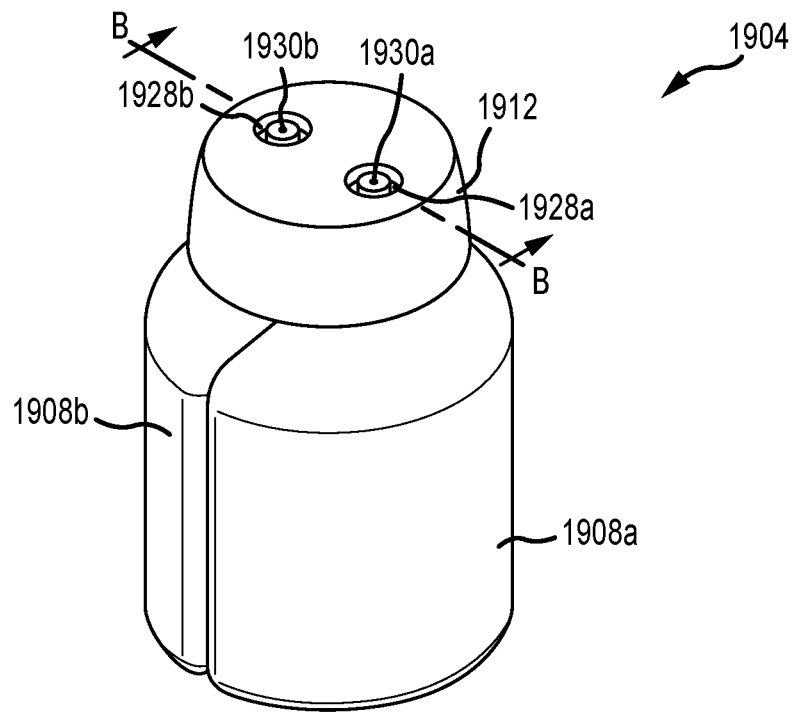
FIG. 19A depicts an isometric view of another embodiment of a sample beverage container.
Figure 19B:
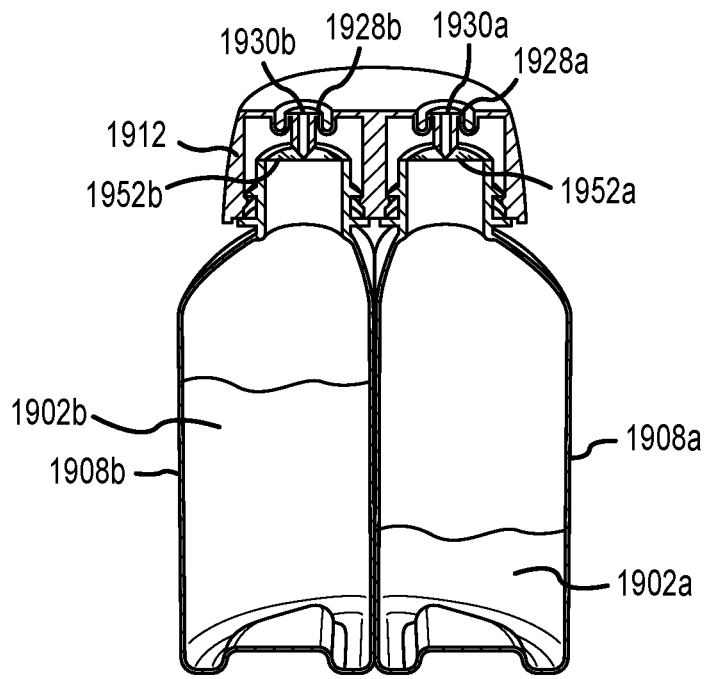
FIG. 19B depicts a cross-sectional view of the sample beverage container of FIG. 19A, taken along line B-B of FIG. 19A.

FIGS. 19A and 19B depict another embodiment of a beverage container. In particular, in the embodiment of FIGS. 19A and 19B, a beverage container 1904 is shown. The beverage container 1904 can be substantially analogous to the various beverage containers, pods, cartridges, and so on described herein. For example, the beverage container 1904 can include a sealed beverage material that is access by one of more internal features of the structures of the beverage container 1904. The beverage container 1904 can be received by one or more of the beverage appliances, machines, and so forth described herein, which can in turn access the beverage material for use in producing a beverage, such as the various single-serving beverages described herein.

Notwithstanding the foregoing similarities, the beverage container 1904 can include multiple discrete or separated internal spaces. Each internal space can hold a designated beverage material separate from one another. This can allow a single container to include multiple different flavors, mixes, syrups, concentrates, and so on for use by an associated beverage machine. In the embodiment of FIGS. 19A and 19B, the beverage container 1904 includes two discrete internal spaces, such as a first internal space defined by a first body portion 1908a and a second internal space defined by a second body portion 1908b. In other cases, the beverage container can include further internal spaces, such as embodiments having three, four, five, or more internal spaces, each separated from one another and configured to hold a distinct beverage material.

Each of the distinct internal spaces can be individually accessed. For example and with reference to FIG. 19A, the beverage container 1904 can include an enclosure 1912 that includes various components, structures, and so forth for individually accessing each of the distinct internal spaces. In this regard, the beverage container 1904 can help reduce cross-contamination, despite having multiple, potentially different beverage materials sealed therein, for at least because the enclosure has separate, internal structures for accessing each beverage material.

For example, as shown in FIG. 19A, the enclosure can include a first moveable portion 1928a and the second moveable portion 1928b. The first moveable portion 1928a and the second moveable portion 1928b can be substantially analogous to the various moveable portions described herein, redundant explanation of which is omitted here for clarity. The first moveable portion 1928a can include at least a first access 1930a and the second moveable portion 1928b can include at least a second access 1930b. The first access 1930a and the second access 1930b can be a through portion of a respective moveable portion that defines an outlet and/or inlet for a corresponding discrete internal space of the beverage container 1904. In other cases, it will be appreciated that the enclosure 1912 can have additional access features that define further or different inlet and outlet paths for the discrete internal spaces as can be appropriate for a given configuration.

With reference to FIG. 19B, a cross-sectional view of the beverage container 1904 of FIG. 19A is shown, taken along line B-B of FIG. 19A. In the cross-sectional representation of the beverage container 1904 shown in FIG. 19B, the discrete internal spaces defined by the first body portion 1908a and the second body portion 1908b are shown. In the sample illustration of FIG. 19B, the first body portion 1908a can hold a first beverage material 1902a, whereas the second body portion 1908b can hold a second beverage material 1902b. The first beverage material 1902a can be distinct from the second beverage material 1902b, including having a different volume, chemical composition, moisture properties, and so on as can be required in order to produce a desired target beverage with an associated beverage appliance.

FIG. 19B also shows that each of the discrete internal spaces can be sealed. For example, the first beverage material 1902a can be sealed within the first body portion 1908a by a first membrane 1952a. Further, the second beverage material 1902b can be sealed within the second body portion 1908b by a second membrane 1952b.

The enclosure 1912 operates to access each of the beverage materials sealed within the beverage container 1904. As shown in FIG. 19B, the first moveable portion 1928a is positioned over or aligned with the first membrane 1952a and the second moveable portion 1928b is positioned over to aligned with the second membrane 1952b. Each of the moveable portions can be advanced toward a respective one of the membranes by a moveable component of an associated beverage machine. In turn, one or both of the first access 1930a or the second access 1930b can extend at least partially through a respective one of the membranes. This can allow the beverage material held by the beverage container to exit and/or allow entry of another material or substance into the beverage container, such as pressurized gas.

As described herein, the various beverage systems, appliances, machines, devices, and so forth can operate to receive a beverage container and access sealed beverage material from the beverage container. The beverage systems may, in turn, process the beverage material and produce a single-serving or other beverage. To facilitate the foregoing, the beverage system can include any appropriate combination and collection of piping, instruments, controls, tanks, vessels, and so forth, including having a supply (or connection to) pressurized gas, precursor liquids, and so forth, that can be used in conjunction with the beverage material of the beverage container to produce a beverage.

Figure 20:
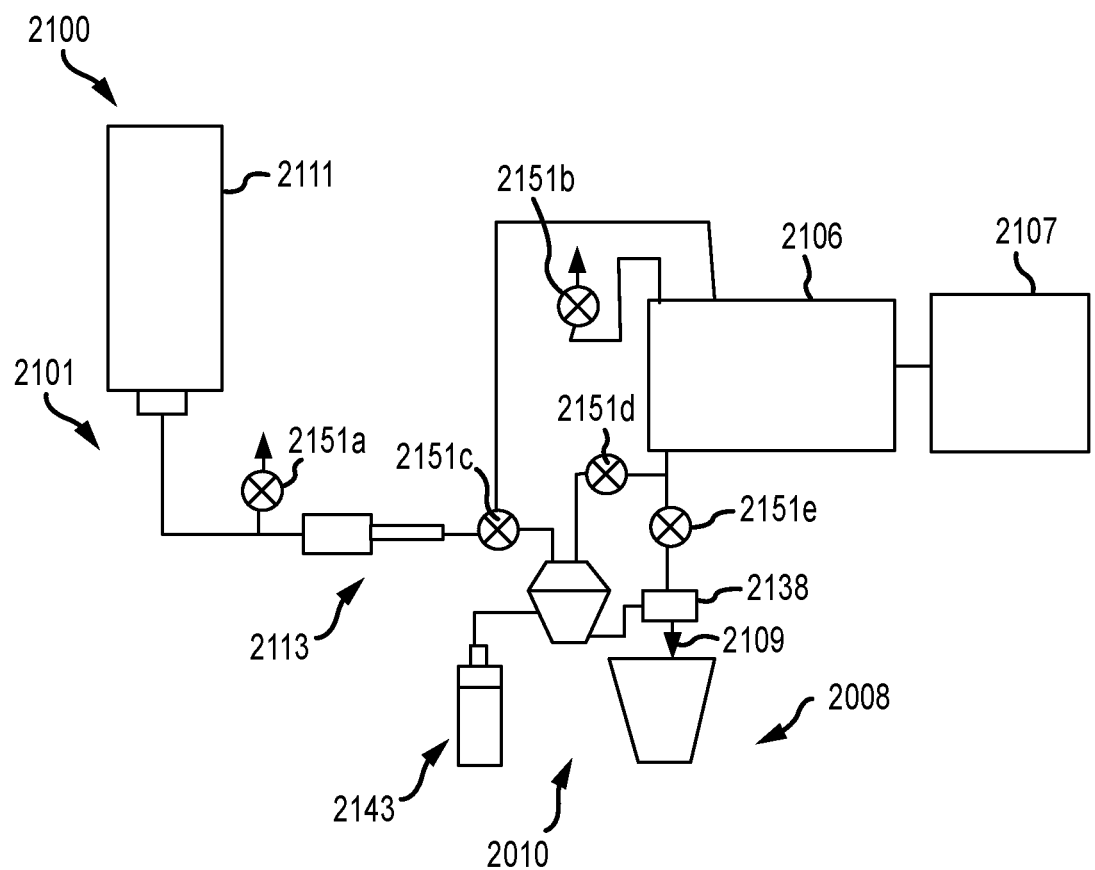
FIG. 20 depicts a schematic view of a beverage system.

As such, while many configurations are possible and within the scope of the present disclosure, FIG. 20 depicts an example diagram illustrating various components of the beverage system described herein. For example, FIG. 20 shows a beverage system 2100 that can be used with a container 2010 that incorporates exemplary features of the present systems and methods. In this illustrative embodiment, precursor liquid such as water is provided by a precursor liquid supply 2101 that originates in the reservoir 2111, which can be removable from the system 2100, e.g., to allow for easier filling, or can be 2010 fixed in place. Although in this embodiment, a user initially provides the beverage precursor liquid in the reservoir 2111, the precursor liquid supply 2101 can include other components to provide liquid to the reservoir 2111, such as a plumbed water line, controllable valve, and liquid level sensor to automatically fill the reservoir 2111 to a desired level, a second water reservoir or other tank that is fluidly connected to the reservoir 2111, and other arrangements. Liquid is delivered by a pump 2113 to the carbonation tank 2106 via a three-way valve 2151c. In this instance, the pump 2113 is a solenoid pump, but other pump types are possible. The carbonation tank 2106 can be suitably filled with liquid using any suitable control method, such as by sensing a level in the carbonation tank 2106 using a conductive probe, pressure sensor, optical sensor or other sensor. A tank vent valve 2151b can be opened during filling to allow the pressure in the carbonation tank 2106 to vent, or can remain closed during filling, e.g., to allow a pressure build up in the carbonation tank 2106. Though not shown in FIG. 20, a control circuit can control operation of the valves 2151, e.g., the valves 2151 can include electromechanical or other actuators, as well as include sensors to detect various characteristics, such as temperature in the carbonation tank 2106, pressure in the carbonation tank 2106, a flow rate of gas or liquid in any of the system flow lines, etc.

To form a beverage, a user can associate a container 2010 with the system 2100, e.g., by loading the container 2010 into a container receiver (e.g., container receiver 1105 of FIG. 11). In this embodiment, however, the container 2010 can includes each of a lower vessel and an upper vessel. The upper vessel can contain a gas source arranged to release carbon dioxide or other gas under pressure for dissolution in a liquid, e.g., for carbonating water. With the container 2010 associated with the system 2100, the control circuit can then activate the system 2100 to deliver liquid to the upper vessel, e.g., to cause carbon dioxide to be generated. While this embodiment uses a container 2010 with a gas source activated by a fluid, other arrangements are possible, including the use of a pressurized gas cylinder as a gas source. The control circuit can start operation of the system 2100 in an automated way, e.g., based on detecting the presence of a container 2010, detecting liquid in the carbonation tank 2106 and closure of the container receiver, and/or other characteristics of the system 2100. Alternately, the control circuit can start system operation in response to a user pressing a start button or otherwise providing input (e.g., by voice activation) to start beverage preparation.

To initiate carbonation, the vent valve 2151b can be closed and the three-way valve 2151c controlled to allow the pump 2113 to pump liquid into the upper vessel that contains a gas source. That is, the system 2100 can include a carbon dioxide activating fluid supply that provides a fluid to an upper vessel so as to activate a carbon dioxide source in the upper vessel to release carbon dioxide gas. In this embodiment, the carbon dioxide source includes a charged adsorbent or molecular sieve, e.g., a zeolite material that has adsorbed some amount of carbon dioxide gas that is released in the presence of water, whether in vapor or liquid form. Of course, other carbon dioxide source materials can be used, such as charcoal or other molecular sieve materials, carbon nanotubes, metal organic frameworks, covalent organic frameworks, porous polymers, or source materials that generate carbon dioxide by chemical means, such as sodium bicarbonate and citric acid (with the addition of water if the bicarbonate and acid are initially in dry form), compressed carbon dioxide bottle gas, or others. In addition, aspects of the exemplary system and method are not necessarily limited to use with carbon dioxide gas, but can be used with any suitable gas, such as nitrogen, which is dissolved in some beers or other beverages, oxygen, air, and others. Thus, reference to "carbonation," "carbon dioxide source," "carbon dioxide activating fluid supply," etc., should not be interpreted as limiting aspects of the exemplary system and method and/or any embodiments to use with carbon dioxide only. Instead, aspects of the exemplary system and method can be used with any suitable gas.

In one embodiment, the charged adsorbent is a zeolite such as analcime, chabazite, clinoptilolite, heulandite, natrolite, phillipsite, or stilbite. The zeolite can be naturally occurring or synthetic, and can be capable of holding up to about 18% carbon dioxide by weight or more. The zeolite material can be arranged in any suitable form, such as a solid block (e.g., in disc form), particles of spherical, cubic, irregular or other suitable shape, and others. An arrangement that allows the zeolite to flow or be flowable, e.g., spherical particles, can be useful for packaging the zeolite in individual containers. Such an arrangement can allow the zeolite to flow from a hopper into a container, for example, simplifying the manufacturing process. The surface area of the zeolite particles can also be arranged to help control the rate at which the zeolite releases carbon dioxide gas, since higher surface area measures typically increase the gas production rate. Generally, zeolite materials will release adsorbed carbon dioxide in the presence of water in liquid or vapor form, allowing the zeolite to be activated to release carbon dioxide gas by the addition of liquid water to the zeolite.

The carbon dioxide activating fluid supply in this embodiment includes a conduit that is fluidly coupled to the pump 2113 and the valve 2151c that can be controlled to open/close or otherwise control the flow of precursor liquid into the upper vessel. That is, a single pump can be arranged to both deliver precursor liquid to the carbonation tank and deliver activating fluid to a gas source. Other arrangements or additions are possible for the carbon dioxide activating fluid supply, such as a dedicated liquid supply for the upper vessel that is separate from the precursor liquid supply, a pressure-reducing element in the conduit, a flow-restrictor in the conduit, a flow meter to indicate an amount and/or flow rate of fluid into the vessel, a syringe, piston pump or other positive displacement device that can meter desired amounts of liquid (whether water, citric acid or other material) to the vessel, and others. In another embodiment, the activating fluid supply can include a gravity fed liquid supply that has a controllable delivery rate, e.g., like the drip-type liquid supply systems used with intravenous lines for providing liquids to hospital patients, or can spray atomized water or other liquid to provide a water vapor or other gas phase activating fluid to the upper vessel.

A carbon dioxide gas supply can be arranged to provide carbon dioxide gas from the upper vessel to an area where the gas is used to carbonate the liquid, in this case, the carbonation tank 2106. The gas supply can be arranged in any suitable way, and in this illustrative embodiment includes a conduit that is fluidly connected between the upper vessel and a carbonated liquid outlet of the carbonation tank 2106. A gas control valve 2151*d* is controllable by the control circuit to open and close the flow path through the gas supply conduit. In some embodiments, the gas control valve 2151*d* can be a check valve that is not controllable by the control circuit.

The gas supply can include other components than a conduit and valve, such as pressure regulators, safety valves, additional control valves, a compressor or pump (e.g., to increase a pressure of the gas), an accumulator (e.g., to help maintain a relatively constant gas pressure and/or store gas), and so on. The use of an accumulator or similar gas storage device can obviate the need to control the rate of gas output by a container. Instead, the gas source can be permitted to emit gas in an uncontrolled manner, with the emitted gas being stored in an accumulator for later delivery and use in producing a sparkling beverage. Gas released from the accumulator could be released in a controlled manner, e.g., at a controlled pressure and/or flow rate. Also, carbonation of the precursor liquid can occur via one or more mechanisms or processes, and thus is not limited to one particular process. For example, while delivery of carbon dioxide gas to the outlet of the carbonation tank 2106 can function to help dissolve carbon dioxide in the liquid, other system components can further aid in the carbonation process. In some embodiments, a sparger can be used to introduce gas into the carbonation tank, precursor liquid can be circulated in the tank, and/or other techniques can be used to alter a rate at which carbonating gas is dissolved.

Before, during and/or after carbonation of the liquid in the carbonation tank 2106, a system 2107 can chill the liquid. As noted above, the cooling system 2107 can operate in any suitable way, e.g., can include ice, refrigeration coils or other cooling elements in thermal contact with the carbonation tank 2106. In addition, the carbonation tank 2106 can include a mixer or other agitator to move the liquid in the carbonation tank 2106 to enhance gas dissolution and/or cooling. Operation in forming a beverage can continue for a preset amount of time, or based on other conditions, such as a detected level of carbonation, a drop in gas production by the upper vessel, or other parameters. During operation, the amount of liquid provided to the upper vessel can be controlled to control gas output. Control of the liquid provided to the upper vessel can be made based on a timing sequence (e.g., the valve 2151*c* can be opened for a period of time, followed by valve closure for a period, and so on), based on detected pressure (e.g., liquid supply can be stopped when the pressure in the carbonation tank 2106 exceeds a threshold, and resume when the pressure falls below the threshold or another value), based on a volume of activating liquid delivered to the upper vessel (e.g., a specific volume of liquid can be delivered to the vessel in one or more discrete volumes), or other arrangements.

With the precursor liquid in the carbonation tank 2106 ready for dispensing, the vent valve 2151*b* can be opened to reduce the pressure in the carbonation tank 2106 to an ambient pressure. As is known in the art, depressurizing the carbonation tank prior to dispensing can aid in maintaining a desired carbonation level of the liquid during dispensing. With the carbonation tank 2106 vented, the vent valve 2151*b* can be closed and a pump vent valve 2151*a* can be opened. The pump 2113 can then be operated to draw air or other gas into the inlet side of the pump 2113 and pump the gas into the carbonation tank 2106 so as to force the precursor liquid in the carbonation tank 2106 to flow into the dispense line 2138. While the pump 2113 delivers air to the carbonation tank, the dispense valve 2151*e* is opened and the gas control valve 2151*d* is closed during liquid dispensing. The dispensed liquid can enter a mixing chamber 2109 at which the carbonated liquid and beverage material provided from the lower vessel of the container 2010 are combined. The beverage material can be moved out of the vessel and to the mixing chamber 2109 by introducing pressurized gas into the vessel, e.g., by way of an air pump 2143.

The control circuit can use one or more sensors to control a carbonation level of the precursor liquid, a temperature to which the liquid is chilled (if at all), a time at which and during which beverage material is delivered to the mixing chamber 2109, a rate at which carbonating gas is produced and delivered to the carbonation tank 2106, and/or other aspects of the beverage making process. For example, a temperature sensor can detect the temperature of the precursor liquid in the carbonation tank 2106. This information can be used to control system operation, e.g., warmer precursor liquid temperatures can cause the control circuit to increase an amount of time allowed for carbon dioxide gas to be dissolved in the precursor liquid. In other arrangements, the temperature of the precursor liquid can be used to determine whether the system 2100 will be operated to carbonate the liquid or not. For example, in some arrangements, the user can be required to add suitably cold liquid and/or ice to the reservoir 2111 before the system 2100 will operate. As discussed above, relatively warm precursor liquid temperatures can cause the liquid to be insufficiently carbonated in some conditions.

In another embodiment, a pressure sensor can be used to detect a pressure in the carbonation tank 2106. This information can be used to determine whether the carbonation tank 2106 is properly or improperly filled, if a pressure leak is present, if carbonation is complete and/or to determine whether sufficient carbon dioxide gas is being produced by the upper vessel 2015. For example, low detected pressure can indicate that more carbon dioxide needs to be generated, and thus cause the control circuit to allow more liquid to be delivered by the activating fluid supply to the upper vessel. Likewise, high pressures can cause the flow of liquid from the activating fluid supply to be slowed or stopped. Thus, the control circuit can control the gas pressure in the carbonation tank 2106 and/or other areas of the system 2100 by controlling an amount of liquid delivered to the upper vessel.

Alternately, low pressure can indicate that there is a leak in the system and cause the system to indicate an error is present. In some embodiments, measured pressure can indicate that carbonation is complete. For example, pressure in the carbonation tank 2106 can initially be detected to be at a high level, e.g., around 70-80 psi, and later be detected to be at a low level, e.g., around 40 psi due to gas being dissolved in the liquid. The low pressure detection can indicate that carbonation is complete.

The control circuit can also be arranged to allow a user to define a level of carbonation (i.e., amount of dissolved gas in the beverage, whether carbon dioxide or other). For example, the control circuit can include a touch screen display or other user interface that allows the user to define a desired carbonation level, such as by allowing the user to select a carbonation volume level of 1, 2, 3, 4, or 5, or selecting one of a low, medium or high carbonation level. Containers used by the system 2100 can include sufficient gas source material to make the highest level of carbonation selectable, but the control circuit can control the system to dissolve an amount of gas in the beverage that is consistent with the selected level. For example, while all containers can be arranged for use in creating a "high" carbonation beverage, the control circuit can operate the system 2100 to use less of the available gas (or cause the gas source to emit less gas than possible) in carbonating the beverage. Carbonation levels can be controlled based on a detected carbonation level by a sensor, a detected pressure in the carbonation tank 2006 or elsewhere, an amount of gas output by the container TO, or other features.

In another embodiment, the container 2010 can include indicia readable by the controller, e.g., a RFID tag, barcode, alphanumeric string, etc., that indicates a carbonation level to be used for the beverage. After determining the carbonation level from the container 10, the control circuit can control the system 2100 accordingly. Thus, a user need not select the carbonation level by interacting with the system 2100, but rather a carbonation level can be automatically adjusted based on the beverage selected. In yet another embodiment, a user can be able to select a gas source vessel that matches a carbonation level the user desires. Different carbonation levels can be provided in the different containers by having different amounts of gas source in the vessel. For example, container 2010 providing low, medium and high carbonation levels can be provided for selection by a user, and the user can pick the container 2010 that matches the desired carbonation level, and provide the selected container to the system. Thus, a gas source vessel labeled "low" can be chosen and used with the system to create a low level carbonated beverage.

A user can alternately be permitted to define characteristics of a beverage to be made by interacting in some way with a container IO to be used by the system 2100. For example, tab, notch or other physical feature of the container 2010 can be altered or formed by the user to signify a desired beverage characteristic. For example, a broken tab, slider indicator, a covered or uncovered perforation on a portion of the container 2010, etc., that is created by the user can indicate a desired carbonation level, an amount of beverage material to use in forming the beverage, where the system 2100 is controllable to use less than all of the beverage material in the container to form a beverage, and so on. Features in the container 2010 can also be used by the control circuit to detect features of the container 2010, a beverage being formed or other components of the system 2100.

The container 2010 can be made of any suitable materials, and is not necessarily limited to the constructions shown herein. For example, the container 2010 can be made of, or otherwise include, materials that provide a barrier to moisture and/or gases, such as oxygen, water vapor, etc. In one embodiment, the container 2010 can be made of a polymer laminate, e.g., formed from a sheet including a layer of polystyrene, polypropylene and/or a layer of EVOH and/or other barrier material, such as a metallic foil. In one embodiment, the container 2010 is injection molded. Moreover, the container 2010 materials and/or construction can vary according to the materials contained in the container 2010. For example, a portion of the container 2010 containing a gas source material can require a robust moisture barrier, whereas a beverage material portion may not require such a high moisture resistance. Thus, the containers can be made of different materials and/or in different ways. In addition, the container 2010 interior can be differently constructed according to a desired function. Thus, as used herein, a "container" can take any suitable form, such as a pod (e.g., opposed layers of filter paper encapsulating a material), capsule, sachet, package, or any other arrangement. The container 2010 can have a defined shape, or can have no defined shape (as is the case with some sachets or other packages made entirely of flexible material). The container can be impervious to air and/or liquid, or can allow water and/or air to pass into the container.

In accordance with one aspect of the exemplary system and method, the container includes an indicator that is readable by a beverage making system or other indicator reader. As non-limiting, illustrative examples, the indicator can be an RFID tag, barcode, alphanumeric string, taggant, taggant ink, or other suitable indicator. The indicator can be used to provide any suitable information to the beverage making system or to another reader. For example, the indicator can inform the beverage making system of the type of contents contained within the container such as a specific flavor, volume, gas-only or beverage material-only, which can cause the beverage making system to perform an operation that is suitable for such contents. In some embodiments, the indicator can provide product authentication, expiration information, and/or manufacturing information such as lot number and manufacturing facility.

Other examples and implementations are within the scope and spirit of the disclosure and appended claims. For example, features implementing functions can also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A beverage container, comprising:
a body defining an internal space configured to hold a beverage medium and an opening extending to the internal space;
a membrane sealing the internal space along the opening; and
an enclosure forming a seal with the body about the opening, extending over the membrane, and defining a gas inlet for a pressurized gas, the enclosure comprising a moveable piercing feature monolithically formed with a flexible diaphragm configured to permit advancement of the moveable piercing feature at least partially through the membrane relative to the gas inlet, wherein the enclosure defines a fluid pathway for delivering the pressurized gas from the gas inlet to the internal space via an exterior inlet passage of the moveable piercing feature.

2. The beverage container of claim 1, wherein:
the enclosure is configured to receive a supply of gas; and
the moveable piercing feature is configured to direct the supply of gas to the internal space via the fluid pathway.

3. The beverage container of claim 1, wherein:
the body includes a rim defining the opening; and
the membrane comprises a sheet of material sealed to the body along a complete rotation of the rim; and
wherein the membrane is configured to maintain the seal with the body in response to an advancement of the moveable piercing feature at least partially through the sheet.

4. The beverage container of claim 1, wherein the moveable piercing feature comprises an elongated protrusion that defines a sharp end portion configured for piercing the membrane.

5. The beverage container of claim 4, wherein:
the moveable piercing feature is configured to produce a single opening through the membrane limited to a size corresponding to a size of the elongated protrusion; and
the exterior inlet passage extends through the single opening.

6. The beverage container of claim 4, wherein the exterior inlet passage is defined by a single recess formed on a side of the elongated protrusion.

7. The beverage container of claim 4, wherein the exterior inlet passage extends along an entire length of the elongated protrusion.

8. A beverage container, comprising:
an enclosure defining a gas inlet for pressurized gas and encompassing a sealed region, the sealed region being configured to prevent escape of a beverage material, the enclosure comprising:
a piercing feature comprising an elongated protrusion defining a first inlet passage along an exterior of the elongated protrusion to the sealed region and a second outlet passage through the elongated protrusion from the sealed region, the enclosure defining a fluid pathway for the pressurized gas from the gas inlet to the sealed region;
a flexible diaphragm monolithically formed with the piercing feature and configured to permit movement of the piercing feature between a first position and a second position relative to the gas inlet, wherein:
in the first position, the piercing feature is offset from the sealed region; and
in the second position, the piercing feature is advanced at least partially through the sealed region, thereby inducing delivery of the pressurized gas with the first inlet passage to the sealed region.

9. The beverage container of claim 8, wherein the piercing feature defines:
an elongated recess that forms the first inlet passage; and
an elongated lumen that forms the second outlet passage.

10. The beverage container of claim 8, wherein the piercing feature comprises a sharp projection housing the two passages.

11. The beverage container of claim 8, wherein the flexible diaphragm is a ring-shaped feature surrounding the piercing feature.

12. The beverage container of claim 8, wherein:
the beverage container further comprises a body configured to hold the beverage material and defining the sealed region; and
the enclosure is connected to the body.

13. The beverage container of claim 12, wherein:
the enclosure further comprises an attachment portion fixed to the body; and
the flexible diaphragm includes a first side connected to the attachment portion and a second side connected to the piercing feature.

14. The beverage container of claim 13, wherein the attachment portion defines the gas inlet.

15. A beverage container, comprising:
a body holding a beverage material and defining a sealed region configured for accessing the beverage material; and
an enclosure connected to the body and covering the sealed region, the enclosure defining a gas inlet at an external surface and comprising a moveable portion moveable relative to the gas inlet, the moveable portion comprising a flexible diaphragm configured for piercing the sealed region and comprising an elongated protrusion monolithically formed with the flexible diaphragm, the elongated protrusion defining:
a first inlet passage fluidically coupled with the gas inlet and configured for pressurized gas introduction into the body; and
a second outlet passage fluidically separated from the gas inlet and configured for beverage material exit,
wherein the enclosure defines a fluid pathway for the pressurized gas from the inlet to the first inlet passage; and
wherein the first inlet passage is configured to deliver the pressurized gas to the sealed region.

16. The beverage container of claim 15, wherein:
the beverage container further comprises a membrane sealing the sealed region; and
the elongated protrusion is configured for forming a single opening in the membrane.

17. The beverage container of claim 15, wherein the second passage is a lumen extending through a thickness of the moveable portion and fluidically coupled with a beverage material outlet of the beverage container that is distinct from the gas inlet.

* * * * *